US011901649B2

United States Patent
Lim et al.

(10) Patent No.: US 11,901,649 B2
(45) Date of Patent: Feb. 13, 2024

(54) METHOD FOR CHANGING GROUND UNIT OF ANTENNA ON BASIS OF DATA THROUGHPUT SPEED ESTIMATION, AND ELECTRONIC DEVICE THEREFOR

(71) Applicant: SAMSUNG ELECTRONICS CO., LTD., Suwon-si (KR)

(72) Inventors: Wonsub Lim, Suwon-si (KR); Doil Ku, Suwon-si (KR); Hyoseok Na, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 442 days.

(21) Appl. No.: 17/268,851

(22) PCT Filed: Aug. 7, 2019

(86) PCT No.: PCT/KR2019/009910
§ 371 (c)(1),
(2) Date: Feb. 16, 2021

(87) PCT Pub. No.: WO2020/036363
PCT Pub. Date: Feb. 20, 2020

(65) Prior Publication Data
US 2021/0242588 A1    Aug. 5, 2021

(30) Foreign Application Priority Data

Aug. 16, 2018    (KR) .................. 10-2018-0095611

(51) Int. Cl.
*H01Q 5/50*       (2015.01)
*H04B 17/318*    (2015.01)
(Continued)

(52) U.S. Cl.
CPC ............... *H01Q 5/50* (2015.01); *H01Q 3/24* (2013.01); *H01Q 5/30* (2015.01); *H04B 17/318* (2015.01); *H04B 17/336* (2015.01)

(58) Field of Classification Search
CPC .. H01Q 5/50; H01Q 3/24; H01Q 5/30; H01Q 1/48; H01Q 21/28; H01Q 1/241;
(Continued)

(56) References Cited

U.S. PATENT DOCUMENTS 9,030,368 B2 * 5/2015 Chen ..................... H01Q 5/30
                                                          343/702
9,985,351 B2 * 5/2018 Kim ...................... H01Q 1/241
(Continued)

FOREIGN PATENT DOCUMENTS

JP    2016-96429       5/2016
KR    10-2012-0030919  3/2012
(Continued)

OTHER PUBLICATIONS

International Search Report for PCT/KR2019/009910 dated Nov. 21, 2019, 5 pages with English Translation.
(Continued)

*Primary Examiner* — Lana N Le
(74) *Attorney, Agent, or Firm* — Nixon & Vanderhye, P.C.

(57) ABSTRACT

Various embodiments disclosed in the present document relate to, an antenna switch for operating in a communication network supporting carrier aggregation (CA), and an electronic device comprising same. According to one embodiment, a method for operating an electronic device having an antenna, the antenna being capable of communicating with an external electronic device via a plurality of frequency bands, may be provided, the method for operating the electronic device comprising the operations of, deter-
(Continued)

mining whether a communication mode of the electronic device is a CA mode, searching for a cell supporting a max data throughput speed, checking an antenna mode in a current state, and determining whether the antenna mode in the current state is an antenna mode for satisfying a frequency band assigned to the cell supporting the max data throughput speed. Such electronic device may vary according to the embodiments, and in addition, an antenna and an electronic device comprising same, according to the various embodiments, may be provided.

10 Claims, 15 Drawing Sheets

(51) Int. Cl.
*H04B 17/336* (2015.01)
*H01Q 5/30* (2015.01)
*H01Q 3/24* (2006.01)

(58) Field of Classification Search
CPC ............ H01Q 1/22; H01Q 1/243; H01Q 1/50; H01Q 5/328; H04B 17/318; H04B 17/336; H04B 1/00; H04B 1/0064; H04B 1/401; H04B 5/0031; H04B 1/006; H04B 7/18558; H04B 1/40; H04B 7/18582; H04B 7/18517; H04B 7/155; H04B 7/0814; H04B 1/44; H04B 1/0475; H04B 7/18532; H04B 7/18586; H04B 1/1615; H04B 1/0057; H04B 1/406; H04B 17/309; H04B 2201/70703; H04B 5/0081; H04B 7/18584; H04B 7/264

See application file for complete search history.

(56) References Cited

U.S. PATENT DOCUMENTS

| | | | | |
|---|---|---|---|---|
| 10,511,081 | B2* | 12/2019 | Chen | H04B 1/006 |
| 10,804,607 | B2* | 10/2020 | Hsieh | H04B 17/336 |
| 10,945,138 | B2* | 3/2021 | Henry | H04B 17/318 |
| 2008/0261551 | A1 | 10/2008 | Catreux-Erceg et al. | |
| 2010/0239040 | A1 | 9/2010 | Beluri et al. | |
| 2013/0177091 | A1 | 7/2013 | Lim et al. | |
| 2014/0086081 | A1 | 3/2014 | Mack et al. | |
| 2015/0009090 | A1* | 1/2015 | Park | H01Q 1/241 |
| | | | | 343/876 |
| 2016/0276742 | A1* | 9/2016 | Yu | H01Q 1/50 |
| 2018/0062249 | A1 | 3/2018 | Sung et al. | |
| 2018/0191421 | A1 | 7/2018 | Seo et al. | |
| 2021/0242567 | A1* | 8/2021 | Wang | H01Q 3/24 |

FOREIGN PATENT DOCUMENTS

| | | |
|---|---|---|
| KR | 10-2018-0024336 | 3/2018 |
| KR | 10-1866479 | 6/2018 |
| KR | 10-2018-0080884 | 7/2018 |
| WO | 2012/095373 | 7/2012 |

OTHER PUBLICATIONS

Written Opinion of the ISA for PCT/KR2019/009910 dated Nov. 21, 2019, 18 pages with English Translation.

* cited by examiner

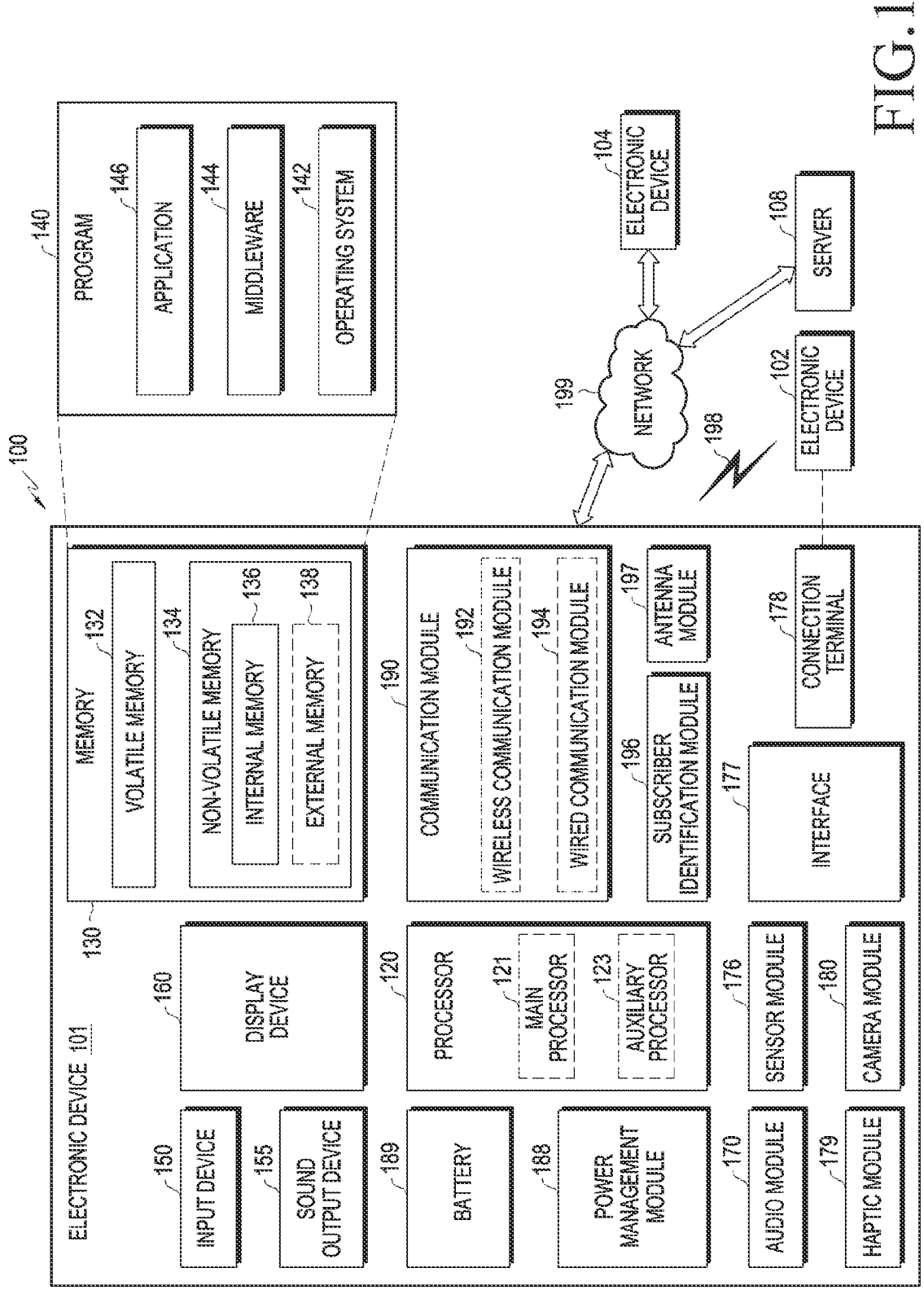

METHOD FOR CHANGING GROUND UNIT OF ANTENNA ON BASIS OF DATA THROUGHPUT SPEED ESTIMATION, AND ELECTRONIC DEVICE THEREFOR

CROSS-REFERENCE TO RELATED APPLICATIONS

This application is a National Phase Entry of PCT international Application No. PCT/KR2019/009910, which was filed on Aug. 7, 2019, and claims priority to Korean Patent Application No. 10-2018-0095611 filed on Aug. 16, 2018, in the Korean Intellectual Property Office, the contents of which are incorporated herein by reference.

BACKGROUND

Field

Various embodiments disclosed herein relate to a method of changing a grounding unit of an antenna based on data processing speed estimation in a network supporting carrier aggregation, and an electronic device including the same.

Description of Related Art

An electronic device may communicate with a base station providing a wireless communication network through an antenna module provided in the electronic device.

As demand for various functions utilizing wireless communication of an electronic device increases, a method for optimizing the quality of communication between an electronic device and a base station and the demand for increasing the amount of communication are increasing. As a method of enhancing the quality of communication between an electronic device and a base station, various methods for reducing signal interference have been disclosed. As a method for increasing the transmission amount of communication between an electronic device and a base station, methods, such as carrier aggregation, have been disclosed.

SUMMARY

Carrier aggregation (hereinafter referred to as 'CA'), introduced to meet the explosive traffic demand is to perform communication by creating a wider frequency band by simultaneously using at least two different frequency bands and, as compared to transmitting/receiving data in a band, this advantageously increases the amount of data transmission/reception by the extended band. For example, if a base station (eNodeB) using two frequency bands (e.g., 850 MHz and 1.8 GHz) transmits signals to the UE supporting carrier aggregation in two frequency bands tied together, then data may be transmitted theoretically two times faster per unit time.

Electronic devices may be equipped with multi-band antennas as antennas formed to perform communication using various frequency bands as well as antennas formed to perform communication using one frequency band so as to provide adaptive and efficient communication in various network environments. As such an antenna, an antenna for supporting carrier aggregation may be mounted. According to an embodiment, in the context where carrier aggregation is performed, the antenna may be operated separately as a primary cell antenna for receiving important control information transmitted from the base station and a secondary cell antenna for receiving other information than the important control information.

Techniques for smoothing communication, such as frequency interference control (CoMP) or handover for switching base stations depending on the position of the electronic device and the position of the external electronic device or other network environment statuses, may be applied between an electronic device (e.g., a user equipment (UE)) and an external electronic device (e.g., a base station (eNodeB)). However, in relation to the operation of the antenna supporting carrier aggregation (CA), the conventional art allocates the switch (or antenna switch) to simply operate as the primary cell antenna and secondary cell antenna as first designated, without considering the network environments which may vary according to changes in the position of the electronic device or bad weather and thus fails to bring about an enhancement in data processing speed due to alterations in network environments around the electronic device.

According to various embodiments of the disclosure, it is possible to provide an enhanced data processing speed in communication between an electronic device and a base station through active switch control of an antenna mounted on the electronic device under a carrier aggregation (CA) condition.

According to various embodiments of the disclosure, there may be provided an electronic device comprising an antenna including a radiating unit capable of communication through a first frequency band and a second frequency band and a power feeding unit, a switch configured to selectively connect at least one of a first grounding unit of the electronic device, corresponding to the first frequency band and a second grounding unit of the electronic device, corresponding to the second frequency band to the radiating unit, and a processor configured to perform communication with an external electronic device by a first data throughput through the first frequency band and the second frequency band, with the radiating unit and the first grounding unit connected together using the switch, and estimate a second data throughput to be executed through the first frequency band and the second frequency band in relation to a state in which the radiating unit and the second grounding unit are to be connected using the switch while performing the communication with the external electronic device, when the first data throughput is greater than the second data throughput, perform the communication with the external electronic device while maintaining the connection between the radiating unit and the first grounding unit using the switch, and when the second data throughput is greater than the first data throughput, connect the radiating unit and the second grounding unit using the switch and perform the communication with the external electronic device, with the radiating unit and the second grounding unit connected together using the switch.

According to various embodiments of the disclosure, there may be provided an electronic device comprising an antenna including a radiating unit capable of communication through a first frequency band and a second frequency band and a power feeding unit, a switch configured to selectively connect at least one of a first grounding unit of the electronic device, corresponding to the first frequency band and a second grounding unit of the electronic device, corresponding to the second frequency band to the radiating unit, and a processor configured to connect at least one of the first grounding unit and the second grounding unit to the radiating unit based on a parameter indicating a signal strength and estimate, at least once, a data throughput according to at least one antenna switch grounding structure, and control the switch by connecting at least one of the first grounding unit and the second grounding unit to the radiating unit to implement an antenna switch grounding structure having a quickest data throughput based on the estimated data throughput.

According to various embodiments of the disclosure, there may be provided a method for operating an electronic device having an antenna capable of communication with an external electronic device through a plurality of frequency bands, comprising determining whether a communication mode of the electronic device is a carrier aggregation (CA) mode, searching for a cell supporting a maximum data throughput, identifying an antenna grounding structure in a current state, and determining whether the antenna grounding structure in the current state is an antenna grounding structure for meeting a frequency band allocated to a cell for supporting the maximum data throughput.

According to an embodiment, the CA mode may correspond to inter band carrier aggregation or intra band non-contiguous carrier aggregation.

According to various embodiments of the disclosure, data processing speed between the electronic device and the external electronic device may be optimized by actively controlling the antenna switch included in the electronic device according to a change in a network environment around the electronic device.

According to various embodiments of the disclosure, it is possible to optimize the data processing speed by actively controlling the antenna switch considering the expected max data throughput or the bandwidth for each different band in the inter band CA or intra band non-contiguous CA environment.

BRIEF DESCRIPTION OF THE DRAWINGS

FIG. 1 is a view illustrating an electronic device in a network environment according to various embodiments;

DETAILED DESCRIPTION

Figure 2A:
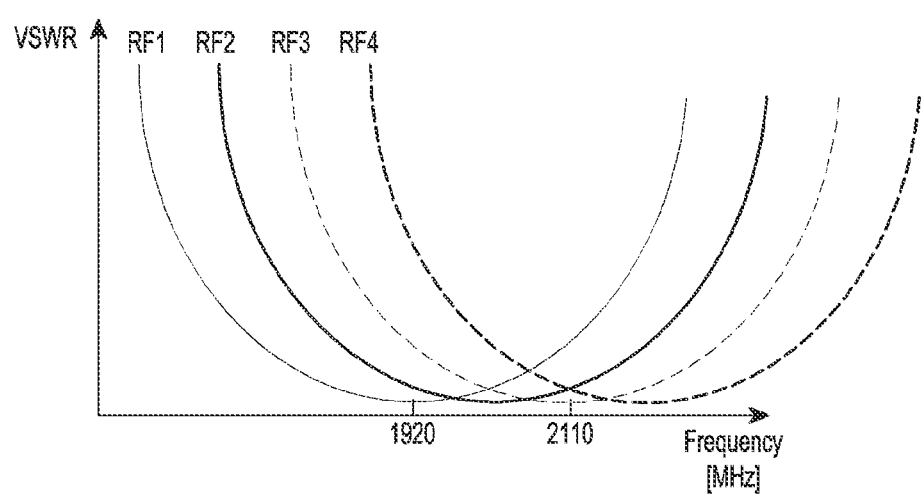
FIG. 2A is a graph illustrating a change in a resonant frequency when switching an antenna according to an embodiment.

Hereinafter, embodiments of the present disclosure are described with reference to the accompanying drawings.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 02) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

An electronic device (e.g., 101 of FIG. 1) according to various embodiments of the disclosure may target an electronic device that supports carrier aggregation (hereinafter, referred to as 'CA'). The electronic device may perform downlink and uplink of data by communicating with an external electronic device (200 of FIG. 4A to be described below) (e.g., a base station (eNodeB)) in the context of supporting CA. Here, the downlink and the uplink of data may be performed individually or through independent processing, and may have different frequency bandwidths in different frequency bands. Hereinafter, for convenience of description, a description of the uplink may be omitted, and the description may focus primarily on the downlink between the electronic device and the external electronic device.

FIG. 2A is a graph illustrating resonant frequencies in various frequency bands according to an embodiment.

For example, an electronic device including a non-CA antenna (e.g., an electronic device in an LTE network environment that does not support CA) uses only the frequency band of one designated band so as to perform communication at the optimized data transmission speed (or capacity) through the antenna module optimized for the band.

FIG. 2A illustrates a voltage standing wave ratio (VSWR) of various RF ports corresponding to various frequency bands. According to some embodiments, an electronic device having a non-CA antenna may change the resonant frequency by appropriately selecting an RF port corresponding to a desired frequency band (antenna switching).

For example, in the case of an electronic device including non-CA antennas, an LTE B1 antenna having a frequency band of about 2.1 GHz may be implemented by selecting the RF port 3 (RF3) illustrated in FIG. 2A, and an LTE B3 antenna having a frequency band of about 1.8 Ghz may be implemented by selecting the RF port 1 (RF1) illustrated in FIG. 2A.

In contrast, an electronic device including CA antennas may bundle and use frequency bands of at least two different designated bands. For example, RF port 3 (RF3) is selected as an LTE B1 antenna having a frequency band of about 2.1 GHz, and RF port 1 (RF1) is selected as an LTE B3 antenna having a frequency band of about 1.8 Ghz, rendering it possible to configure antennas allocated to two different frequency bands simultaneously and thereby implementing a higher data transmission speed than that of electronic devices with non-CA antennas.

In the following embodiments, a first frequency band and a second frequency band may be described as examples. According to an embodiment, the first frequency band and the second frequency band may be bands that are not continuous to each other. According to an embodiment, the first frequency band and the second frequency band form an inter band (non-contiguous component carriers in different bands (e.g., B1, B3)) or intra band non-contiguous. (non-contiguous component carriers in the same band (e.g., B1)). However, the frequency bands described in various embodiments of the disclosure are not limited to the first frequency band and the second frequency band but may rather include other various frequency bands, such as a third frequency band and a fourth frequency band. The following embodiments may also apply where other various frequency bands are included.

According to an embodiment, taken is an example in which the first frequency band corresponds to, e.g., LTE B1 band, and the second frequency band corresponds to, e.g., LTE B3 band. However, according to another embodiment, the first frequency band may correspond to the LTE B3 band, and the second frequency band may correspond to the LTE B1 band. Although described below is an example in which the first frequency band is the LTE B1 band, and the second frequency band is the LTE B3 band, embodiments of the disclosure are not limited thereto. Further, although in the example described below the bandwidth of each frequency band has a different bandwidth (the LTE B1 band has a bandwidth of about 20 Mhz, and the LTE B3 band has a bandwidth of 10 Mhz), embodiments of the disclosure are not limited thereto. For example, the first frequency band (e.g., LTE B1 band) may have a bandwidth of about 10 Mhz, and the second frequency band (e.g., LTE B3 band) may have a bandwidth of about 10 Mhz.

Figure 2B:
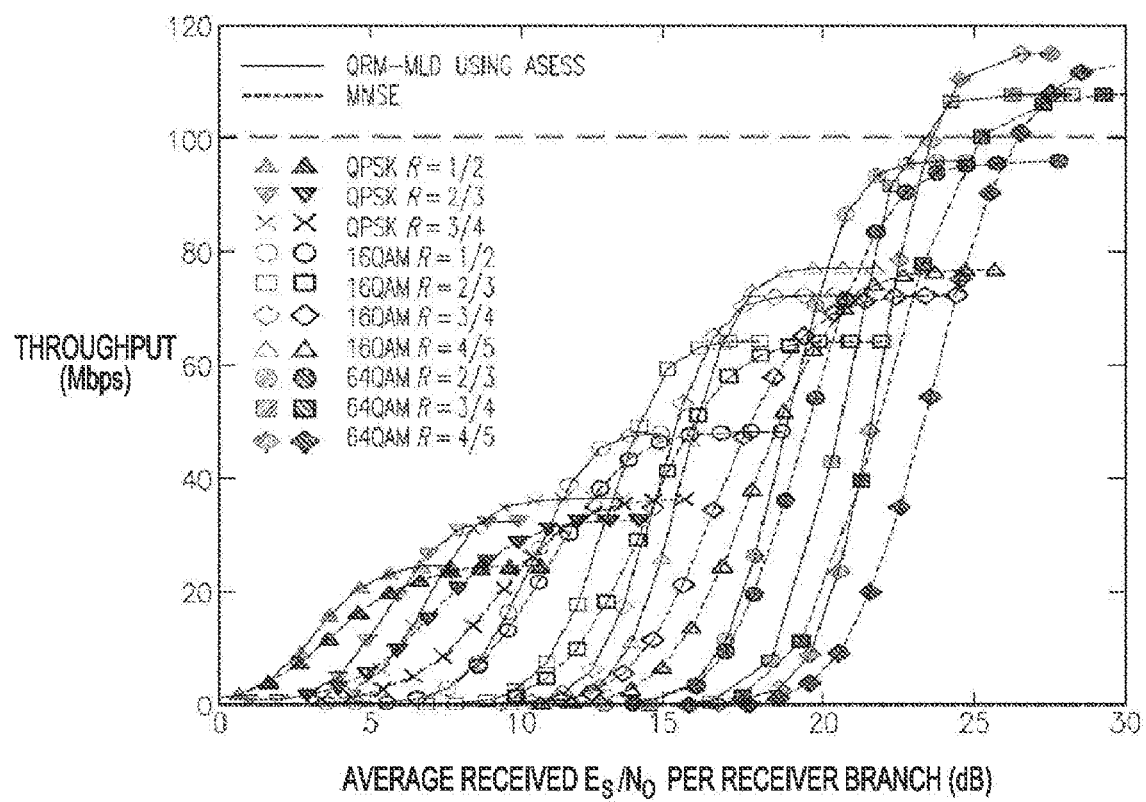
FIG. 2B is a graph illustrating a change in data throughput when a modulation and coding scheme (MCS) index is changed according to an embodiment.

FIG. 2B is a graph illustrating a change in data throughput (hereinafter, referred to as 'TPUT') when a modulation and coding scheme (MCS) index is changed according to an embodiment.

Referring to FIG. 2B, as examples of modulation of a wireless network signal, there may be disclosed binary phase-shift keying (QPSK) capable of transmitting 2-bit data on one signal, 16-quadrature amplitude modulation (16-QAM) capable of transmitting 4-bit data on one signal, and 64-quadrature amplitude modulation (64-QAM) capable of transmitting 6-bit data on one signal and, as example code rates, R=1/2, R=2/3, R=3/4, and R=4/5 may be disclosed. Of course, the types and combinations of modulation and coding rates of the disclosure are not necessarily limited to the above embodiments.

[Table 1] below may be referred to as another example of the MCS index. [Table 1] below shows a correlation between modulation and code rate according to MCS index allocation.

TABLE 1

| MCS index | Modulation | Code rate |
|---|---|---|
| 10 | QPSK | 0.56 |
| 11 | QPSK | 0.63 |
| 12 | 16 QAM | 0.36 |
| 13 | 16 QAM | 0.4 |
| 14 | 16 QAM | 0.46 |
| 15 | 16 QAM | 0.51 |
| 16 | 16 QAM | 0.54 |
| 17 | 16 QAM | 0.54 |
| 18 | 16 QAM | 0.58 |
| 19 | 64 QAM | 0.43 |
| 20 | 64 QAM | 0.47 |
| 21 | 64 QAM | 0.51 |
| 22 | 64 QAM | 0.55 |
| 23 | 64 QAM | 0.59 |
| 24 | 64 QAM | 0.64 |
| 25 | 64 QAM | 0.68 |
| 26 | 64 QAM | 0.72 |
| 27 | 64 QAM | 0.75 |
| 28 | 64 QAM | 0.88 |

According to various embodiments, the MCS may form the MCS index as various combinations of the modulation and the code rate, and each MCS index may correspond to a unique data processing rate (TPUT) value. Referring to FIG. 2B, as the MCS index transmits more bits and has a higher code rate, this may mean that the electronic device with the MCS index may have a higher data throughput (TPUT). A look at the contents of FIG. 2B and Table 1 together reveals that a combination of a specific modulation and code rate may be allocated to a unique MCS index, and when a certain electronic device has a high MCS index, this may mean that it may generally have the data throughput (TPUT). According to an embodiment, the MCS index may be stored, as a look-up table, in a memory (e.g., 120 of FIG. 1) of an electronic device (e.g., 101 of FIG. 1), and may be used in the data rate processing estimation method described below. Here, the MCS index may be adjusted according to the channel state (signal quality or signal strength (hereinafter, referred to as 'signal strength')) between the electronic device (e.g., 101 of FIG. 1) and the external electronic device (e.g., eNodeB) (e.g., 104 of FIG. 1) communicating with the electronic device in the network (e.g., 199 of FIG. 1) where the electronic device is in. According to various embodiments, the MCS index may be adjusted according to the size of data (TBS: transport block size) or data throughput (or data amount) transmitted within the corresponding network. For example, if the size of data transmitted within the network is small or the transmission speed is low, a lower MCS index may be allocated, and if the size or amount of data transmitted within the network is large, a higher MCS index may be allocated. The electronic device (e.g., 101 of FIG. 1) may use various reference signals (RS), such as measurement reference signal (MRS), beam reference signal (BRS), and channel state information reference signal (CSI-RS) to measure the signal strength. The good signal strength may mean that the distortion of the received signal is small compared to the transmitted signal. Accordingly, when the signal strength is good, the electronic device may reduce power consumption due to the operation of the electronic device and decoding. When the signal strength is not good, the decoding success probability may be increased by using a relatively low MCS. That is, the MCS index may be adjusted considering a correlation between the operation of the electronic device and power consumption according to the signal strength.

Figure 3:
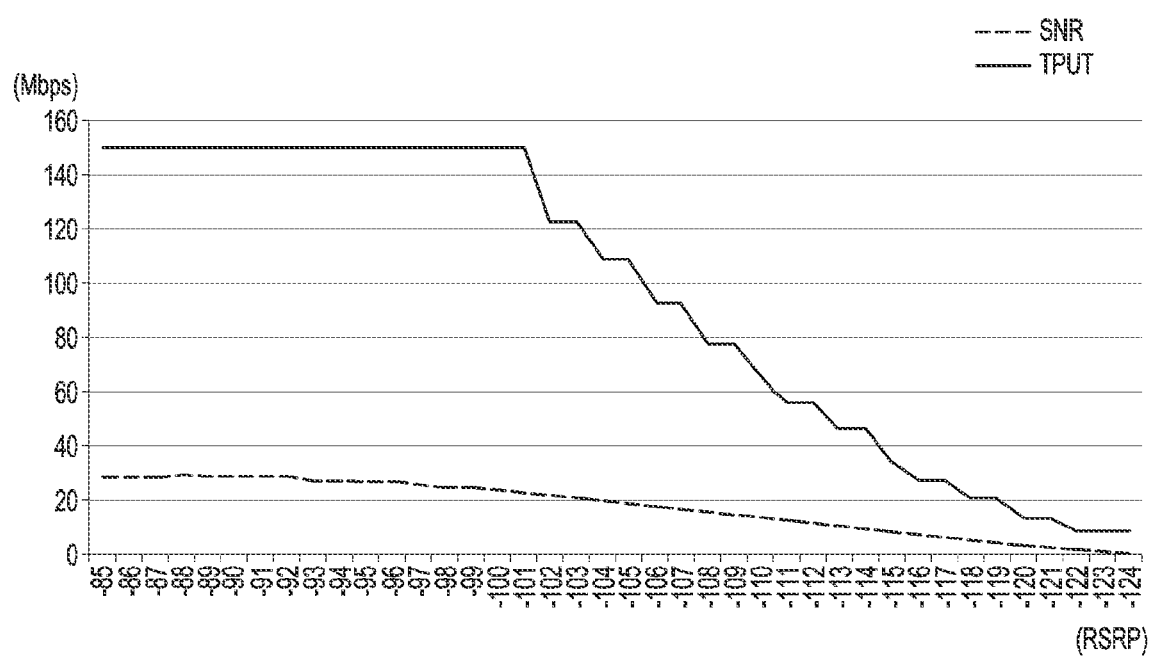
FIG. 3 is a graph illustrating a signal-to-noise ratio (SNR) for each electric field and a data throughput for each electric field, according to various embodiments.

FIG. 3 is a graph illustrating a signal-to-noise ratio (SNR) for each electric field and a data throughput for each electric field, according to various embodiments.

According to various embodiments of the disclosure, as a parameter representing an electric field (or electric field strength), the reference signal received power (RSRP) (shown below in Table 3), which is the parameter obtained by linearly averaging a power distribution of resource elements including the cell-specific reference signal (RS) within the measurement bandwidth in Watts, may be used. According to an embodiment, the electronic device (e.g., 101 of FIG. 1) may report information on the RSRP to an external electronic device (e.g., a base station (eNodeB)) in real time or according to a predetermined period. According to an embodiment, the electronic device (e.g., a portable terminal) (e.g., 101 of FIG. 1) may receive a signal from the external electronic device (e.g., a base station (eNodeB)) (e.g., 104 of FIG. 1) while simultaneously reporting the information on the RSRP to the external electronic device.

According to various embodiments, instead of RSRP, at least one of the received signal strength indicator (RSSI), the reference signal received quality (RSRQ), and channel quality information (CQI) may be used as the parameter representing the electric field.

[Table 2] below illustrates various embodiments in which the signal to noise ratio (SNR) value for each electric field measured at the LTE B1 antenna having a frequency band of 2.1 GHz is matched with the MCS and the corresponding maximum data throughput (max TPUT).

TABLE 2

| RSRP(dBm) | SNR | MCS | TPUT |
|---|---|---|---|
| −85 | 29 | 26 | 150 |
| −86 | 29 | 26 | 150 |
| −87 | 29 | 26 | 150 |
| −88 | 29 | 26 | 150 |
| −89 | 29 | 26 | 150 |
| −90 | 29 | 26 | 150 |
| −91 | 29 | 26 | 150 |

TABLE 2-continued

| RSRP(dBm) | SNR | MCS | TPUT |
|---|---|---|---|
| −92 | 29 | 26 | 150 |
| −93 | 28 | 26 | 150 |
| −94 | 28 | 26 | 150 |
| −95 | 27 | 26 | 150 |
| −96 | 27 | 26 | 150 |
| −97 | 26 | 26 | 150 |
| −98 | 25 | 26 | 150 |
| −99 | 25 | 26 | 150 |
| −100 | 24 | 26 | 150 |
| −101 | 23 | 26 | 150 |
| −102 | 22 | 24 | 123 |
| −103 | 21 | 24 | 123 |
| −104 | 20 | 22 | 109 |
| −105 | 19 | 22 | 109 |
| −106 | 18 | 20 | 93 |
| −107 | 17 | 20 | 93 |
| −108 | 16 | 18 | 78 |
| −109 | 15 | 18 | 78 |
| −110 | 14 | 16 | 65 |
| −111 | 13 | 14 | 56 |
| −112 | 12 | 14 | 56 |
| −113 | 11 | 12 | 46 |
| −114 | 10 | 12 | 46 |
| −115 | 9 | 10 | 35 |
| −116 | 8 | 8 | 28 |
| −117 | 7 | 8 | 28 |
| −118 | 6 | 6 | 21 |
| −119 | 5 | 6 | 21 |
| −120 | 4 | 4 | 14 |
| −121 | 3 | 4 | 14 |
| −122 | 2 | 2 | 9 |
| −123 | 1 | 2 | 9 |
| −124 | 0 | 2 | 9 |

For example, the RSRP range in which the electronic device (e.g., a portable terminal) (e.g., 101 of FIG. 1) reports to the external electronic device (e.g., a base station (eNodeB)) (e.g., 104 of FIG. 1) is about −44 dBm to about −140 dBm. The RSRP value may vary depending on the distance from the external electronic device (e.g., a base station (eNodeB)) where the electronic device provides an electric field within a specific range of cell (or coverage). For example, when the external electronic device (e.g., a base station (eNodeB)) is located at a side edge of a cell, the RSRP near the center of the cell may be about −75 dBm, and the RSRP at the other side edge of may be about −120 dBm. In [Table 2], the RSRP may represent an electric field from about −85 dBm to about −124 dBm, except for the strong electric field (including the extremely strong electric field) of about −84 dBm or more and the weak electric field (including the extremely weak electric field) of about −125 dBm or less. Looking at [Table 2] and FIG. 3 together reveals that as the RSRP decreases (or the electric field decreases), the signal-to-noise ratio (SNR) may gradually deteriorate, and it has a generally decreasing pattern on the graph. Referring to [Table 2], it may be identified that when the signal-to-noise ratio (SNR) decreases, the corresponding MCS index also generally decreases. As described above, since the MCS index may correspond to the data throughput (TPUT), as the RSRP decreases, the data throughput (TPUT) of the antenna belonging to the corresponding RSRP electric field may decrease.

Referring to FIG. 3, when the RSRP has an electric field of about −85 dBm or less to about −101 dBm or more, there is no change in the MCS index, and thus, there may be no change in the data throughput (RPUT). Further, when the RSRP has an electric field of about −102 dBm or less to about −124 dNm or more, the MCS may decrease as the RSRP decreases, and accordingly, the data throughput (TPUT) may be noticeably reduced. For example, when the RSRP is about −101 dBm or more, the modulation of the MCS index maintains 64QAM, and when the RSRP falls below about −102 dBm, it is changed from 64QAM to 16QAM, resulting in a lower data throughput (TPUT), and from about −113 dBm, it is changed to QPSK, which further lowers the data throughput (TPUT) so that it converges to 0 Mbps. That is, in a section above a specific electric field, even when the RSRP changes, there may be no change in the data throughput (TPUT), but when the RSRP changes in a section lower than the specific electric field, there may be a change in the data throughput (TPUT).

Described below are an antenna that supports carrier aggregation (CA) and forms a plurality of frequency bands, an electronic device (e.g., 101 of FIG. 1) including the same, and a method of operating the electronic device.

First, an electronic device 300 (e.g., 101 of FIG. 1) according to various embodiments of the disclosure is described with reference to FIGS. 4A to 7, and a method of operating the electronic device 300 (e.g., 101 of FIG. 1) according to various embodiments of the disclosure is described with reference to FIGS. 8 to 13.

Figure 4A:
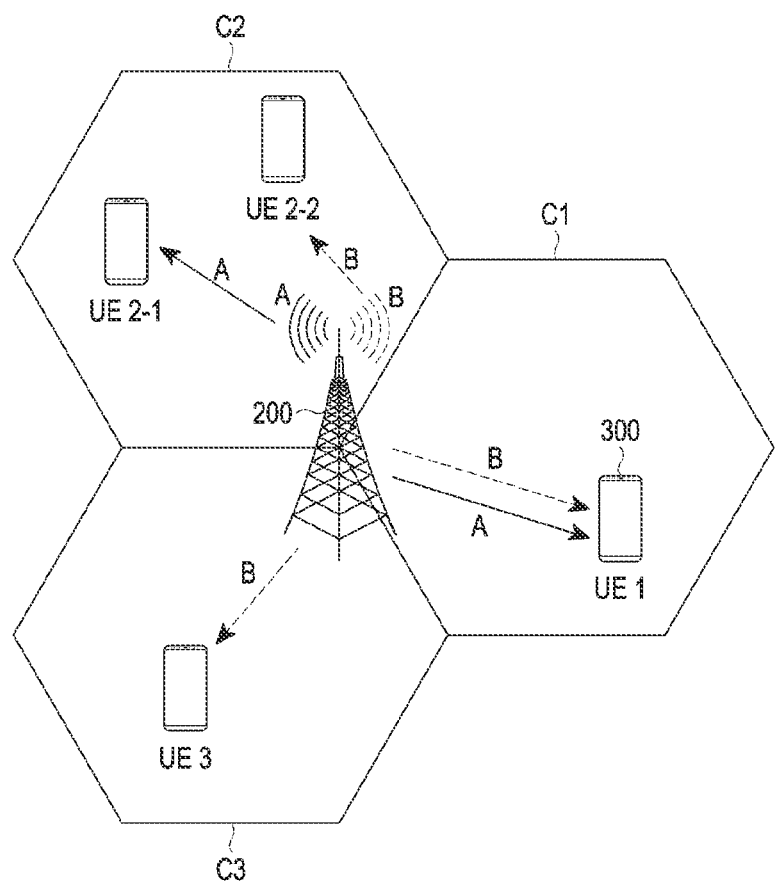
FIG. 4A is a view illustrating a communication aspect between an electronic device and an external electronic device in a network environment, according to various embodiments.
Figure 4B:
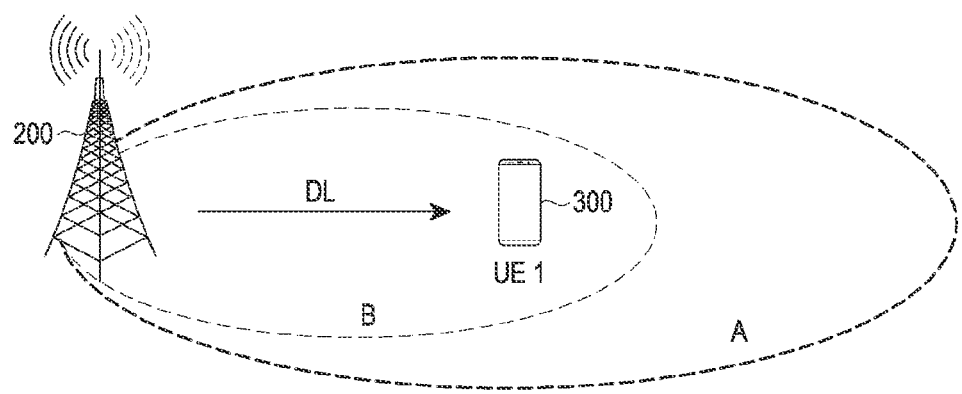
FIG. 4B is a view illustrating a communication aspect between an electronic device and an external electronic device in a network environment, according to various embodiments.

FIG. 4A illustrates an aspect of communication between an electronic device 300 (e.g., 101 of FIG. 1) and an external electronic device 200 (e.g., a base station (eNodeB)) in a network environment (e.g., 199 of FIG. 1) according to various embodiments. FIG. 4B illustrates an aspect of communication between an electronic device 300 (e.g., 101 of FIG. 1) and an external electronic device 200 (e.g., a base station (eNodeB)) in a network environment (e.g., 199 of FIG. 1) according to various embodiments.

Referring to FIG. 4A, the external electronic device 200 (e.g., a base station (eNodeB)) (e.g., 104 of FIG. 1) under a network environment (e.g., 199 of FIG. 1) may communicate with various electronic devices 300 (user equipment) (e.g., UE1, UE2-1, UE2-2, and UE3) within various cells (or coverage) (e.g., C1, C2, and C3). The electronic device 300 according to various embodiments of the disclosure may be located in any one cell C1 among various cells provided by the external electronic device 200. According to an embodiment, the location of the electronic device 300 may be changed according to the movement of the user, and may move into another cell not illustrated in the drawings or a cell provided by another external electronic device (not shown). According to various embodiments of the disclosure, the external electronic device 200 (e.g., a base station) may implement carrier aggregation (CA) by providing two or more different frequency bands. For example, a base station (eNodeB) using two frequency bands (e.g., about 1.8 GHz, about 2.1 GHz) transmits signals to the electronic device 300 supporting CA, with the two frequency bands bundled up, thereby enhancing the data throughput (TPUT) of the electronic device 300. However, in the carrier aggregation (CA) mode, the electronic device 300 may implement carrier aggregation (CA) by receiving two or more different frequency bands from the external electronic device 200 and, in a mode other than the carrier aggregation (CA) mode, the electronic device 300 may transmit/receive data with the external electronic device 300 through one frequency band (e.g., about 1.8 GHz).

Referring to FIG. 4B, in a network environment (e.g., 199 of FIG. 1) using two or more different frequency bands, the electronic device 300 (e.g., 101 of FIG. 1) may transmit/receive data through two types of cells (or coverage) provided through an external electronic device 200 (e.g., 101 of FIG. 1). One of the two types of cells may be Pcell(A), which is an area covered by the primary component carrier (PCC), and the other may be Scell(B), which is an area covered by the secondary component carrier (SCC). The electronic device 300 may acquire system information through the Pcell or perform handover control between a plurality of cells (or coverage), perform a radio resource control (RRC) connection, and additionally secure radio resources according to addition (band addition) of another band (e.g., Scell).

According to various embodiments, in the case of carrier aggregation (CA), three or more different frequency bands may be grouped in which case the electronic device 300 uses one Pcell and a plurality of S cell's to transmit/receive data with the external electronic device. In this way, the electronic device 300 may transmit/receive data through the Pcell and the Scell, but may exchange primary information with the external electronic device 200 through the Pcell. Accordingly, according to an embodiment, the data throughput TPUT through the Pcell may be set to have a higher speed than the data throughput TPUT through the Scell. According to an embodiment, the bandwidth BW allocated to the Pcell may be set higher than the bandwidth BW allocated to the Scell. For example, the bandwidth of the Pcell may be set to about 20 Mhz, and the bandwidth of the Scell may be set to about 10 Mhz.

The embodiments described below in connection with FIGS. 5 to 7 may apply to the electronic device 300 (e.g., 101 of FIG. 1) in the network environment of FIGS. 4A and 4B described above.

Figure 5:
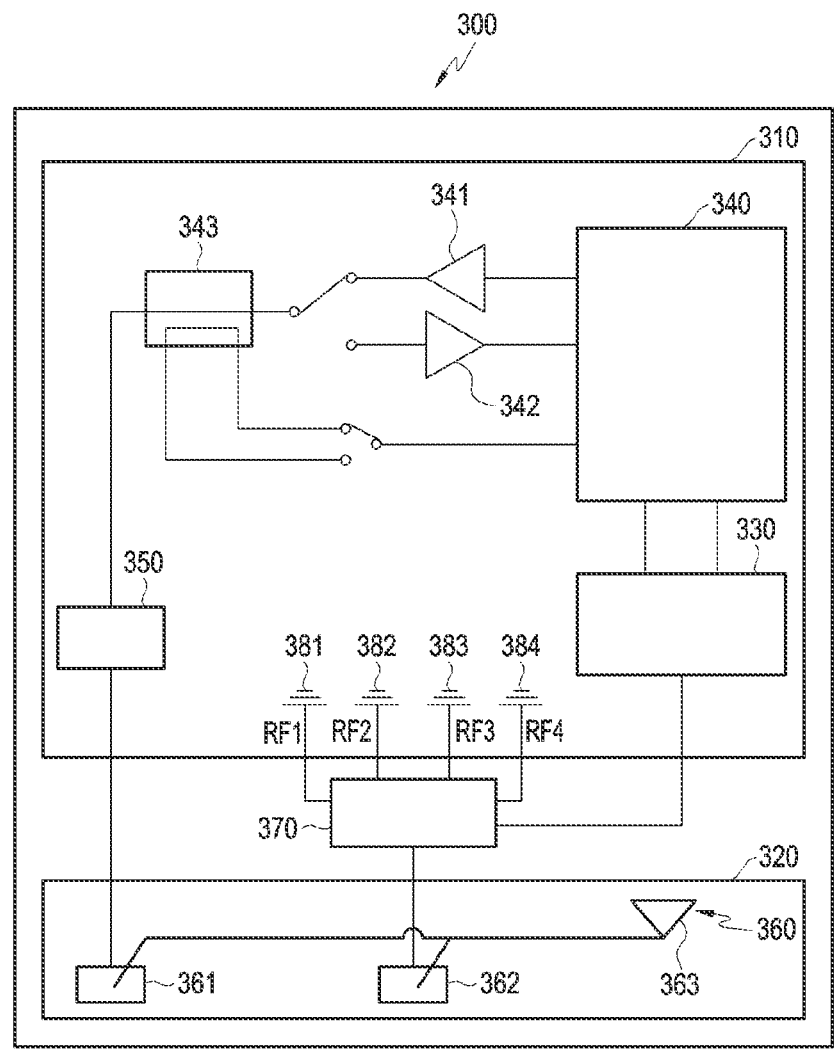
FIG. 5 is a view illustrating an antenna module and a switch (or antenna switch) of an electronic device according to various embodiments.

FIG. 5 is a view illustrating an antenna 360 (e.g., the antenna module 197 of FIG. 1) and a switch 370 (or antenna switch) of the electronic device 300 (e.g., 101 of FIG. 1) according to various embodiments. FIG. 6 is a view illustrating operations of a switch 470 for antennas 461 and 462 according to various embodiments. FIG. 7 is a view illustrating a signal transmission path between an electronic device 300 and an external electronic device 200 according to various embodiments.

Referring to FIG. 5, the electronic device 300 may include a first substrate 310 and a second substrate 320. Various circuits and elements for processing a signal received from the antenna 360 or transmitting a signal to the antenna 360 may be mainly disposed on the first substrate 310. According to various embodiments, the entire or at least part of the antenna 360 may be disposed on the second substrate 320. According to an embodiment, the second substrate 320 itself may be configured and used as a radiating unit 363. Although FIG. 5 illustrates that at least one grounding unit 381, 382, 383, or 384 is formed on the first substrate 310, embodiments of the disclosure are not limited thereto.

Referring to FIG. 5, the electronic device 300 may include a communication processor (CP) 330 (e.g., the processor 120 of FIG. 1). The communication processor 330 may be integrated with another processing module, e.g., at least one processor, such as an application processor (AP). For example, the communication processor 330 may be implemented in a system on chip (SoC). The communication processor 330 may be simply referred to as the processor 330 in the disclosure.

According to various embodiments, the processor 330 may be electrically connected to an RF circuit, e.g., a radio frequency integrated chip (RFIC), to control the frequency of the antenna. According to an embodiment, the RF circuit may be referred to as a transceiver 340 in the disclosure. According to another embodiment, the RF circuit may be understood as a concept encompassing various hardware components for processing communication signals, such as amplifiers, e.g., a power amplifier (PA) or a low noise amplifier (LNA), and a filter in addition to a transceiver.

According to various embodiments, the electronic device 300 may include an antenna 360 and a switch 370 that is electrically connected to the antenna 360 and sets various frequency bands. According to an embodiment, the antenna 360 may include at least one radiating unit 363 and may be configured as an integrally configured component or a 'module' that performs one or more functions.

In the example of FIG. 5, the antenna 360 may be a multi-band antenna for supporting a plurality of bands. The multi-band antenna may be an antenna capable of data transmission/reception in a plurality of channel bands (e.g., 800 Mhz, 850 Mhz, 900 Mhz, 1.8 Ghz, 2.1 Ghz, . . . ). According to various embodiments, the multi-band antenna may be a dual band antenna capable of data transmission/reception in two bands, a triple band antenna capable of data transmission/reception in three bands, or an antenna capable of data transmission/reception in four or more bands.

According to various embodiments, the antenna 360 may be used as a main antenna, or may be used as a diversity antenna.

Although FIG. 5 illustrates an example in which the antenna 360 is an inverted F-type antenna for securing a wide frequency bandwidth within a limited space of the electronic device 300, this is merely an example and does not limit the antenna module 360 of the disclosure.

According to various embodiments, the first substrate 310 may be provided with a power supply device (not shown) for supplying power to the antenna 360 and various components positioned on the first substrate 310. According to various embodiments, the first substrate 310 may further include at least one power modulator. Further, a first element 343, a second element 350, and at least one power amplifier (PA) 341 and 342 may be further positioned on the first substrate 310 and connected to be operable with the processor 330 and the transceiver 340 in a data transmission/reception process 350. According to various embodiments, the first element 343 may include a coupler for checking signals transmitted/received through the antenna 360, and the second element 350 may include an automatic impedance tuner (AIT) that changes the size or band of the resonance frequency of the antenna on the feeding side.

According to various embodiments, a power feeding unit 361 connected to one side of the antenna 360 to feed power, and a connecting part 362 for electrically connecting the radiating unit 363 and the switch 370 of the antenna 360 may be formed on the second substrate 320.

Other various antenna structures which may be modified by one of ordinary skill in the art may be taken into consideration.

According to various embodiments, one side of the switch 370 is electrically connected to the antenna 360, and the other side may be connected with at least one grounding unit (e.g., at least one of 381, 382, 383, and 384) to set various frequency bands. Since the radiating unit 363 is formed at one end of the antenna 360, when the switch 370 connects any one grounding unit (e.g., 381) and the antenna 360, the electronic device 300 may have an electrical length capable of transmitting/receiving at least one frequency band.

For example, a method of setting a frequency band using two different grounding units 381 and 382 is described. The first frequency band of signals may be transmitted/received by connecting the radiating unit 365 with the first grounding unit 381 via the switch 370, and the second frequency band of signals may be transmitted/received by connecting the radiating unit 363 with the second grounding unit 382. Here, the connection state of the switch 370 forming the first frequency band may be referred to as a 'first antenna grounding structure', and the connection state of the switch 370 forming the second frequency band may be referred to as a 'second antenna grounding structure'. According to various embodiments, the first antenna grounding structure may be implemented through a connection between the radiating unit 363 and the first grounding unit 381, and the second antenna grounding structure may be implemented through the radiating unit 363 and the second grounding unit. According to an embodiment, the second antenna grounding structure may be implemented by connecting the radiating unit 363 and the second grounding unit 382, with the radiating unit 363 and the first grounding unit 381 disconnected from each other. According to another embodiment, the second antenna grounding structure may be implemented by connecting the radiating unit 363 and the second grounding unit 382 while the connection between the radiating unit 363 and the first grounding unit 381 is maintained.

According to various embodiments, in addition to the first grounding unit 381 and the second grounding unit 382, the electronic device 300 may transmit/receive signals in a third frequency band through connection between the third grounding unit 383 and radiating unit 363 of FIG. 5 and/or signals in a fourth frequency band through connection between the fourth grounding unit 384 and the radiating unit 363. Here, the third and fourth frequency bands may be the same or different from the first and second frequency bands. According to various embodiments, in addition to the above-described embodiments, the electronic device 300 may further include at least one grounding unit and components according thereto in order to process communication signals.

According to various embodiments, the signal in the first frequency band and the signal in the second frequency band are not necessarily formed only be connection between the radiating unit 363 and the first grounding unit 381, and connection between the radiating unit 363 and the second grounding unit 382. For example, the first frequency band of signals and the second frequency band of signals may be formed by other various combinations of connection between the radiating unit 363 and the first grounding unit 381 and connection between the radiating unit 363 and the second grounding unit 382. For example, additionally or alternatively, the first frequency band of signals and the second frequency band of signals may be formed via various combinations related to connection between the radiating unit 363 and the third grounding unit 383 or connection between the radiating unit 363 and the fourth grounding unit 384.

In the following description and claims, when the first frequency band and the second frequency band correspond to the first grounding unit and the second grounding unit, respectively, the first grounding unit and the second grounding unit may be, rather than hardware components, electrical connection states of the antenna.

The electronic device 300 may include various antenna structures in addition to the example illustrated in FIG. 5. For example, one main antenna 360 for transmission/reception and a plurality of sub-antennas for transmission/reception (not shown) may be disposed in an appropriate position considering other electronic components and designs of the electronic device 300.

Figure 6:
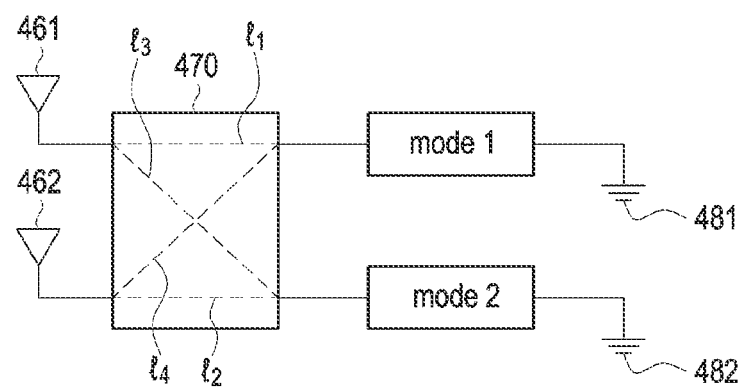
FIG. 6 is a view illustrating operations of a switch for an antenna module according to various embodiments.

Referring to FIG. 6, an embodiment of an electronic device (e.g., 300 of FIG. 5) including a plurality of antennas 461 and 462 is disclosed.

An electronic device according to various embodiments of the disclosure may include a plurality of antennas 461 and 462. According to various embodiments, a plurality of antennas 461 and 462 are connected to a switch 470, and the switch 470 may transfer various frequency bands of signals by connecting a plurality of grounding units 481 and 482 and the plurality of antennas 461 and 462 according to various transmission paths 11, 12, 13, and 14. Multiple input/output (MIMO) transmission/reception may be performed using such a plurality of antennas. According to another embodiment, single input/output (SISO) transmission/reception may also be selectively performed with the plurality of antennas.

According to various embodiments, the antenna 360 may include a part of a housing that forms the exterior of the electronic device 300. When the housing include a metal frame (e.g., metal), the antenna 360 extends by a predetermined length to secure a required frequency band, forming a part of the housing, with the other portions insulated.

Figure 7:
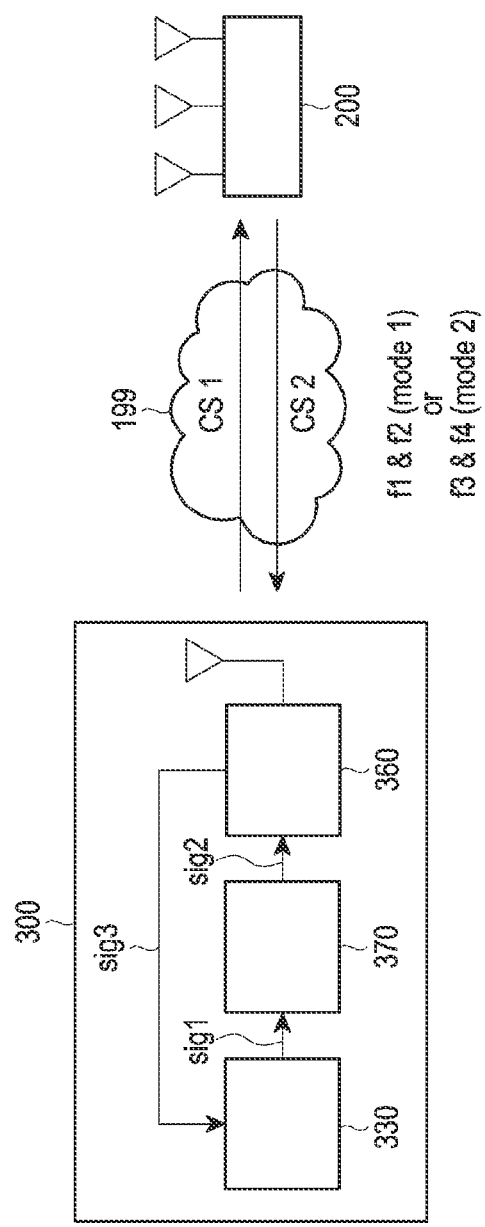
FIG. 7 is a view illustrating a signal transmission path between an electronic device and an external electronic device according to various embodiments.

FIG. 7 is a view illustrating a wireless communication signal transmission path in a network environment (e.g., 199 of FIG. 1) of an electronic device 300 (e.g., 101 of FIG. 1) and an external electronic device 200 (e.g., 104 of FIG. 1) according to various embodiments.

According to various embodiments, the electronic device 300 may receive a first communication signal CS1 from the external electronic device 200, and the external electronic device 200 may receive a second communication signal CS2 from the electronic device 300. Here, the first communication signal CS1 and/or the second communication signal CS2 may be transmitted in the form of a data packet, and may include various traffic information, a reference, and a control signal.

According to various embodiments, the processor 330 (e.g., 120 of FIG. 1) of the electronic device 300 controls the switch 370 to change the frequency band of the signal transmitted from the antenna 360 according to various use environments of the electronic device 300, thereby securing the optimal data throughput (TPUT).

According to various embodiments, the processor 330 may receive the first communication signal CS1 transmitted from the external electronic device 200 through the antenna 360. According to an embodiment, the processor 330 issues a control command to the switch 370 (sig1), and before the switch 370 changes the frequency band that may be transmitted from the antenna 360 (sig2), the processor 330 receives information of the first communication signal CS1 received through the antenna 360 via the feedback line sig3, thereby allowing the processor 330 to set an appropriate MCS index in the current network state. The current network status may be identified through parameters related to signal strength, such as PSRP, SNR, or MCS described above, and the data throughput (TPUT) of various frequency bands (e.g., first frequency band and second frequency band) may be estimated according to the grounding structure (e.g., the first antenna grounding structure or second antenna grounding structure) of the switch 370.

Referring to FIGS. 5 to 7 together, when forming a certain antenna grounding structure (e.g., the first antenna grounding structure), the electronic device 300 according to various embodiments are capable of data transmission/reception with the external electronic device 200 in two frequency bands, e.g., the first frequency band f1 and the second frequency band f2. Here, a data communication mode through the frequency band in which the first frequency band f1 and the second frequency band f2 are aggregated may be referred to as a first mode (mode1). Further, the electronic device 300 may form an antenna grounding structure (e.g., a second antenna grounding structure) according to another embodiment, and in this case also, the electronic device 300 may perform data transmission/reception with the external electronic device 200 through two frequency bands, e.g., the first frequency band f3 and the second frequency band f4. Here, a data communication mode through a frequency band in which the first frequency band f3 and the second frequency band f4 are aggregated may be referred to as a second mode (mode2). The processor 330 may control the switch 370 to select an optimized grounding connection (or optimized mode) that is more advantageous in terms of data throughput (TPUT) of the first antenna grounding structure (or mode 1) and the second antenna grounding structure (or mode 2) and transmit/receive data.

The processor 330 may command the switch 370 to form an antenna grounding structure (e.g., the first antenna grounding structure or the second antenna grounding structure) having an optimized data throughput (optimized TPUT) in various use environments of the electronic device 300. According to various embodiments, the switch 370 may electrically connect at least one of a plurality of grounding units (e.g., at least one of 381, 382, 383, and 384 of FIG. 5) with at least one radiating unit (e.g., 363 of FIG. 5). Accordingly, the electronic device 300 may communicate with the external electronic device 200 in a frequency band having an optimized data throughput (optimized TPUT) in a corresponding electric field (or signal strength).

According to an embodiment, the electronic device 300 may form the first antenna grounding structure to be advantageous for data transmission/reception with the Pcell of the Pcell and Scell provided by the external electronic device 200 and, in this case, the electronic device 300 may communicate with the external electronic device 200 through the first mode (mode 1). According to an embodiment, the electronic device 300 may form the second antenna grounding structure to be advantageous for data transmission/reception with the Scell of the Pcell and Scell provided by the external electronic device 200 and, in this case, the electronic device 300 may communicate with the external electronic device 200 through the second mode (mode 1). According to an embodiment, when the antenna 360 of the electronic device 300 communicates with the external electronic device 200 in the first mode (mode 1), it may have an optimized data throughput (optimized TPUT), and according to another embodiment, when the antenna 360 of the electronic device 300 communicates with the external electronic device 200 in the second mode (mode 2), it may have an optimized data throughput (optimized TPUT).

Operations of the processor 330 according to various embodiments may be described with reference to FIGS. 5 to 7 together.

According to various embodiments of the disclosure, the processor 330 uses the switch 370 to perform communication (CS1 & CS2) with an external electronic device at a first data throughput via the first frequency band and the second frequency band, with the radiating unit (e.g., 363 of FIG. 5) connected with the first grounding unit (e.g., 381 of FIG. 5). According to an embodiment, the first data throughput may be a data throughput (TPUT) according to the first antenna grounding structure.

According to various embodiments, while performing the communication (CS1 & CS2) with the external electronic device 200, the processor 330 may estimate a second data throughput that is to be performed through the first frequency band the second frequency band in connection with the state in which the radiating unit (e.g., 363 of FIG. 5) and the second grounding unit (e.g., 382 of FIG. 5) are to be connected using the switch 370. According to an embodiment, the second data throughput may be a data throughput (TPUT) according to the second antenna grounding structure.

The first data throughput and the second data throughput may be estimated by receiving, in real-time or periodically, the first communication signal CS1 transmitted from the external electronic device 200 through the antenna module 360 as in the embodiment of FIG. 7.

According to various embodiments, when the first data throughput is greater than the second data throughput, the processor 330 may perform the communication (CS1 & CS2) with the external electronic device 200 while maintaining the connection between the radiating unit (e.g., 363 of FIG. 5) and the first grounding unit (e.g., 381 of FIG. 5) (e.g., in the state of forming the first antenna grounding structure) using the switch 370.

In contrast, when the second data throughput is greater than the first data throughput, the processor 330 may connect the radiating unit (e.g., 363 of FIG. 5) with the second grounding unit (e.g., 382 of FIG. 5) using the switch 370 and perform the communication (CS1 & CS2) with the external electronic device 200, with the radiating unit (e.g., 363 of FIG. 5) and the second grounding unit (e.g., 382 of FIG. 5) connected (e.g., in the state of forming the second antenna grounding structure) via the switch 370.

In another embodiment, the processor 330 may connect at least one of the first grounding unit (e.g., 381 of FIG. 5) and the second grounding unit (e.g., 382 of FIG. 5) to the radiating unit (e.g., 363 of FIG. 5) based on a parameter indicating signal strength (e.g., RSRP, SNR, or MCS), estimate data throughputs according to at least two or more antenna grounding structures, and selectively connect at least one of the first grounding unit (e.g., 381 of FIG. 5) and the second grounding unit (e.g., 382 of FIG. 5) with the radiating unit (e.g., 363 of FIG. 5) to implement an antenna grounding structure having the highest data throughput based on the estimated data throughputs, thereby controlling to change the antenna grounding structure. Here, the estimation of the data throughput may refer to a look-up table for the correlation between MCS and data throughput (TPUT) previously stored in the memory (e.g., 120 of FIG. 1).

Figure 8:
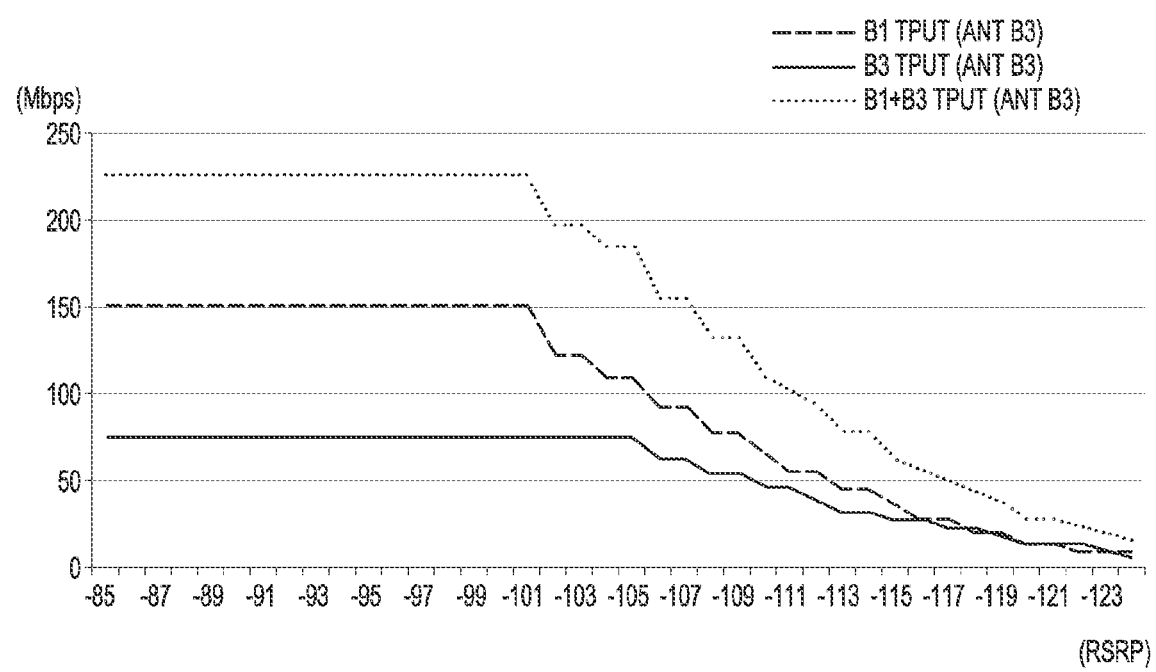
FIG. 8 is a graph illustrating data per-electric field data processing speeds (data throughput) of a first frequency band, a second frequency band, and an aggregated wave band (first frequency band and second frequency band) according to an embodiment.

FIG. 8 is a graph illustrating data per-electric field data processing speeds (TPUT) of a first frequency band, a second frequency band, and an aggregated wave band (first frequency band and second frequency band) according to an embodiment.

According to an embodiment, as illustrated in FIG. 8, an LTE B1 band having a BW (band width) of about 20 MHz may be selected as a first frequency band, and an LTE B3 band having a BW (band width) of about 10 MHz may be selected as a second frequency band. According to an embodiment, as illustrated, the data throughput (TPUT) according to the first frequency band has a slope section (a section in which it decreases as the electric field decreases) where the RSRP is about −101 dBm or less, and the data throughput (TPUT) according to the second frequency band may have a slope section (a section in which it decreases as the electric field decreases) where the RSRP is about −104 dbm or less. As illustrated in FIG. 8, in a certain network situation where the electric field decreases, the data throughputs (TPUT) of the first frequency band and the second frequency band may change in different electric fields (e.g., as the electric field decreases, the data throughput (TPUT) reduces).

According to an embodiment, carrier aggregation (CA) may be performed, with a first frequency band (e.g., LTE B1 band) of the electronic device (e.g., 300 of FIG. 7) allocated to the Pcell provided by the external electronic device (e.g., 200 of FIG. 7), and the second frequency band (e.g., LTE B3 band) of the electronic device (e.g., 300 of FIG. 7) allocated to the Scell. The maximum data throughput (TPUT) of the first frequency band (e.g., LTE B1 band) is about 150 Mbps, and the maximum data throughput (TPUT) of the second frequency band (e.g., LTE B3 band) is about 75 Mbps. Thus, the sum of the maximum data throughputs (TPUT) of the aggregated wave bands may be about 225 Mbps. Since the aggregated wave bands reflect the effect of the electric field on each band, the data throughput (TPUT) of the aggregated wave bands may decrease as the electric field reduces. According to the embodiment illustrated in FIG. 8, it may be identified that a slope section is formed from about −101 dBm to about −125 dBm RSRP is formed and, from about −125 dBM, it converges to about 0 Mbps.

[Table 3] below shows the results of comparison in maximum data throughput (TPUT) when the electronic device (e.g., 300 of FIG. 7) communicates with the external electronic device (e.g., 200 of FIG. 7) according to two different communication modes (e.g., the first mode (mode1) and the second mode (mode2)). In [Table 3], item B1 (e.g., LTE B1 band) may indicate a band having a bandwidth of about 20 MHz, and item B3 (e.g., LTE B3 band) may indicate a band having a bandwidth of about 10 MHz. Item B1+B3 may indicate an aggregated band of item B1 and item B3.

According to an embodiment, item ANT B3 may indicate a state in which the connection state of the antenna switch included in the electronic device (e.g., 300 of FIG. 7) is set to be advantageous for the LTE B3 band (e.g., the first antenna grounding structure). In this case, the electronic device (e.g., 300 of FIG. 7) may form a frequency band according to, e.g., the first mode (mode1), with the external electronic device (e.g., 200 of FIG. 7). Further, item ANT B1 may indicate a state in which the connection state of the antenna switch included in the electronic device (e.g., 300 of FIG. 7) is set to be advantageous for the LTE B1 band (e.g., the second antenna grounding structure). In this case, the electronic device (e.g., 300 of FIG. 7) may form a frequency band according to, e.g., the second mode (mode2), with the external electronic device (e.g., 200 of FIG. 7).

Here, when the antenna switch connection state is set to be advantageous for a specific band, this may mean forming an antenna grounding structure to be advantageous for data transmission/reception in the corresponding frequency band.

TABLE 3

| Table 3-1 ANT B3(Default) | | | | Table 3-2 ANT B1(TPUT Optimized) | | | | |
|---|---|---|---|---|---|---|---|---|
| B1 RSRP | B1 TPUT | B1 TPUT | B1 + B3 Total TPUT | B1 RSRP | B1 TPUT | B3 TPUT | B1 + B3 Total TPUT | Delta |
| −97 | 150 | 75 | 225 | −97 | 150 | 75 | 225 | 0% |
| −98 | 150 | 75 | 225 | −98 | 150 | 75 | 225 | 0% |
| −99 | 150 | 75 | 225 | −99 | 150 | 75 | 225 | 0% |
| −100 | 150 | 75 | 225 | −100 | 150 | 75 | 225 | 0% |
| −101 | 150 | 75 | 225 | −101 | 150 | 75 | 225 | 0% |
| −102 | 123 | 75 | 198 | −102 | 150 | 75 | 225 | 14% |
| −103 | 123 | 75 | 198 | −103 | 150 | 61.5 | 211.5 | 7% |
| −104 | 109 | 75 | 184 | −104 | 150 | 61.5 | 211.5 | 15% |
| −105 | 109 | 75 | 184 | −105 | 150 | 54.5 | 204.5 | 11% |
| −106 | 93 | 61.5 | 154.5 | −106 | 123 | 54.5 | 177.5 | 15% |
| −107 | 93 | 61.5 | 154.5 | −107 | 123 | 46.5 | 169.5 | 10% |
| −108 | 78 | 54.5 | 132.5 | −108 | 109 | 46.5 | 155.5 | 17% |
| −109 | 78 | 54.5 | 132.5 | −109 | 109 | 39 | 148 | 12% |
| −110 | 65 | 46.6 | 111.5 | −110 | 93 | 32.5 | 125.5 | 13% |
| −111 | 56 | 46.5 | 102.5 | −111 | 93 | 32.5 | 125.5 | 22% |
| −112 | 56 | 39 | 95 | −112 | 78 | 28 | 106 | 12% |
| −113 | 46 | 32.5 | 78.5 | −113 | 78 | 28 | 106 | 35% |
| −114 | 46 | 32.5 | 78.5 | −114 | 65 | 23 | 88 | 12% |
| −115 | 35 | 28 | 63 | −115 | 56 | 23 | 79 | 25% |
| −116 | 28 | 28 | 56 | −116 | 56 | 17.5 | 73.5 | 31% |
| −117 | 28 | 23 | 51 | −117 | 46 | 14 | 60 | 18% |
| −118 | 21 | 23 | 44 | −118 | 46 | 14 | 60 | 36% |
| −119 | 21 | 17.5 | 38.5 | −119 | 35 | 14 | 49 | 27% |
| −120 | 14 | 14 | 28 | −120 | 28 | 10.5 | 38.5 | 38% |
| −121 | 14 | 14 | 28 | −121 | 28 | 7 | 35 | 25% |
| −122 | 9 | 14 | 23 | −122 | 21 | 4.5 | 25.5 | 11% |
| −123 | 9 | 10.5 | 19.5 | −123 | 21 | 4.5 | 25.5 | 31% |
| −124 | 9 | 7 | 16 | −124 | 14 | 4.5 | 18.5 | 16% |

Referring to [Table 3], the left part (Table 3-1) of [Table 3] may show the data throughput (TPUT) when the electric field (e.g., RSRP) decreases as the antenna (e.g., 360 of FIG. 7) of the electronic device (e.g., 300 of FIG. 7) forms the first antenna grounding structure, and the first frequency band (e.g., LTE B1 band) (e.g., f1 of FIG. 7) and the second frequency band (e.g., LTE B3 band) (e.g., f2 of FIG. 7) form a frequency band according to the first mode (mode1). The embodiment of FIG. 8 described above may be a graph for the data according to the left part (Table 3-1) of [Table 3].

The right part (Table 3-2) of [Table 3] may show the data throughput (TPUT) when the electric field (e.g., RSRP) decreases as the antenna (e.g., 360 of FIG. 7) of the electronic device (e.g., 300 of FIG. 7) forms the second antenna grounding structure, and the first frequency band (e.g., LTE B1 band) (e.g., f3 of FIG. 7) and the second frequency band (e.g., LTE B3 band) (e.g., f4 of FIG. 7) form a frequency band according to the second mode (mode2).

According to an embodiment, the left part (Table 3-1) of [Table 3] may show variations in data throughput (TPUT) (e.g., first data throughput) per electric field according to the default value of the antenna switch connection state of the electronic device (e.g., 300 of FIG. 7). According to an embodiment, when the electronic device (e.g., 300 of FIG. 7) communicates with the Pcell and the Scell of the external electronic device (e.g., 200 of FIG. 7), the default value may correspond to the state in which the connection is made to be advantageous for data transmission/reception of the Pcell of the Pcell and Scell. The right part (Table 3-2) of [Table 3] may show variations in data throughput (TPUT) (e.g., second data throughput) per electric field for the optimized antenna switch connection state of the electronic device (e.g., 300 of FIG. 7) according to some embodiments. According to an embodiment, when the electronic device (e.g., 300 of FIG. 7) communicates with each of the Pcell and the Scell of the external electronic device (e.g., 200 of FIG. 7), if the antenna switch connection state is optimized, a connection may be made to be advantageous for data transmission/reception of the Scell of the Pcell and the Scell.

Referring to the left part (Table 3-1) of [Table 3], when the electronic device (e.g., 300 of FIG. 7) has the first antenna grounding structure (e.g., the state in which a connection is made to be advantageous for data transmission/reception of the Pcell of the Pcell and Scell), the electric field may decrease so that the data throughput (TPUT) of the first frequency band (e.g., LTE B1 band) may first reduce. Referring to the right part (Table 3-2) of [Table 3], when the electronic device (e.g., 300 of FIG. 7) has the second antenna grounding structure (e.g., the state in which a connection is made to be advantageous for data transmission/reception of the Scell of the Pcell and Scell), the electric field may decrease so that the data throughput (TPUT) of the second frequency band (e.g., LTE B3 band) may first reduce.

Comparison as to the total data throughput (total TPUT) in the carrier aggregation (CA) mode reveals that, as compared to the total data throughput (total TPUT) in the left part (Table 3-1) of [Table 3], the total data throughput (total TPUT) of the right part (Table 3-2) of [Table 3] may be formed to be larger. For example, a look at around about −120 dBm of RSRP reveals that, as compared with the total data throughput (total TPUT) when the antenna (e.g., 360 of FIG. 7) forms the first antenna grounding structure, the total data throughput (total TPUT) may have an additional gain of about 38% when the antenna (e.g., 360 of FIG. 7) forms the second antenna grounding structure.

Figure 9:
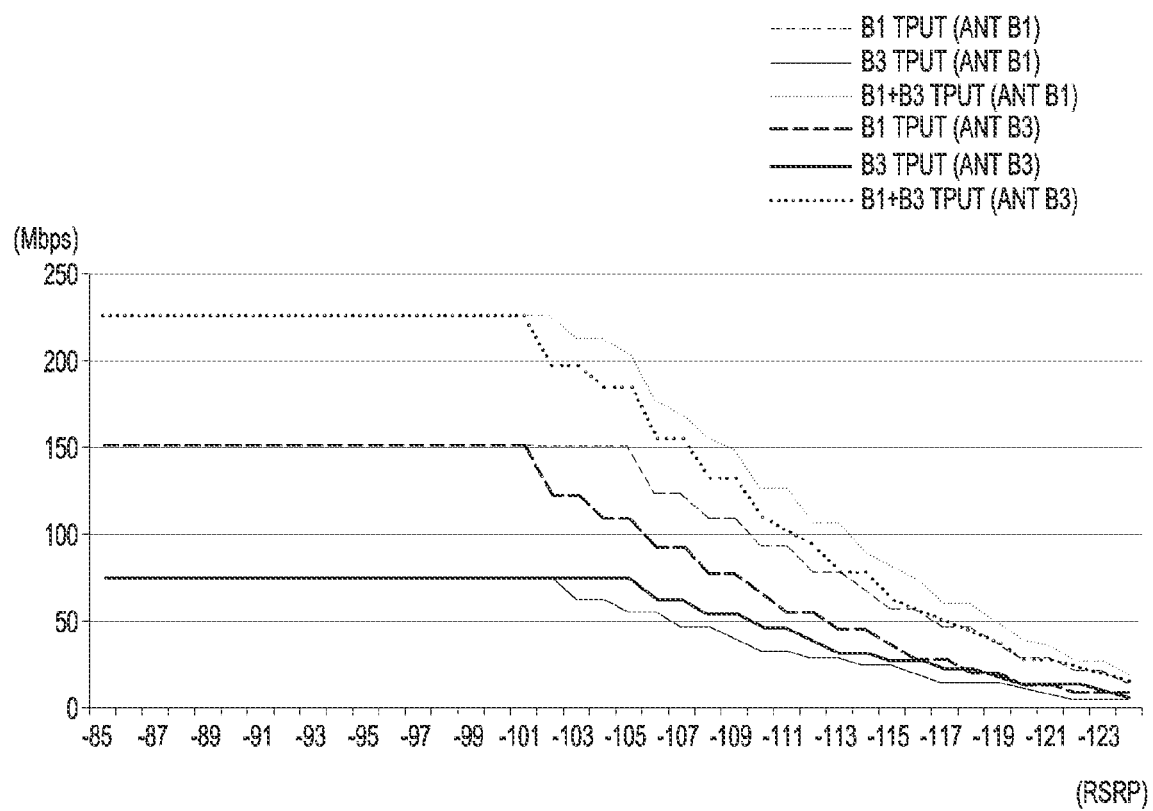
FIG. 9 is a graph illustrating per-electric field data processing speeds (data throughput) of a first frequency band, a second frequency band, and an aggregated wave band (first frequency band and second frequency band) in a first mode and per-electric field data processing speeds (data throughput) of a first frequency band, a second frequency band, and an aggregated wave band (first frequency band and second frequency band) in a second mode according to various embodiments.

FIG. 9 is a graph illustrating per-electric field data throughputs of the first frequency band (e.g., LTE B1 band), second frequency band (e.g., LTE B3 band), and aggregated wave band (aggregation of the first frequency band and the second frequency band) (e.g., LTE B1+B3 band) in the first mode (mode 1) (e.g., ANT B3) and per-electric field data throughputs of the first frequency band (e.g., LTE B1 band), second frequency band (e.g., LTE B3 band), and aggregated wave band (aggregation of the first frequency band the second frequency band) (e.g., LTE B1+B3 band) in the second mode (mode 2) (e.g., ANT B1), according to various embodiments.

According to various embodiments, the electric field (or electric field strength) may be divided into an extremely strong electric field (e.g., about −69 dBm or more) section, a strong electric field (e.g., about −70 dBm to about −84 dBm) section, a medium electric field (e.g., about −85 dBm to about −101 dBm) section, a weak electric field (e.g., about −102 dBm to about −116 dBm) section, and an extremely weak electric field (e.g., about −116 dBm or less) section. Of course, the specific boundaries of the electric field sections may be different according to embodiments.

FIG. 9 may be a graph illustrating the results of [Table 3]. As illustrated in the graph, as compared to the case where the first antenna grounding structure is formed (mode1) (e.g., ANT B3), when the second antenna grounding structure is formed (mode2) (e.g., ANT B1), the data throughput (TPUT) may be identified to be high in the whole range (e.g., the medium and weak electric field ranges (including the extremely weak electric field range)) not more than the electric field strength (e.g., about −102 dBm) at which the data throughput (TPUT) starts to reduce. It may be identified from this that it would be much more advantageous in terms of data throughput (TPUT) performance in the medium and weak electric field ranges to change the antenna grounding structure into the state (e.g., the second antenna grounding structure) in which the total expected maximum TPUT may be enhanced over the preset default (e.g., the first antenna grounding structure) in some situations. In an environment in which the electric field decreases (for example, in an environment in which the signal strength reduces), the data throughput (TPUT) may be enhanced by estimating the data throughput (TPUT) in real time or periodically and optimizing the connection state of the antenna switch of the electronic device (e.g., 300 of FIG. 5).

Figure 10:
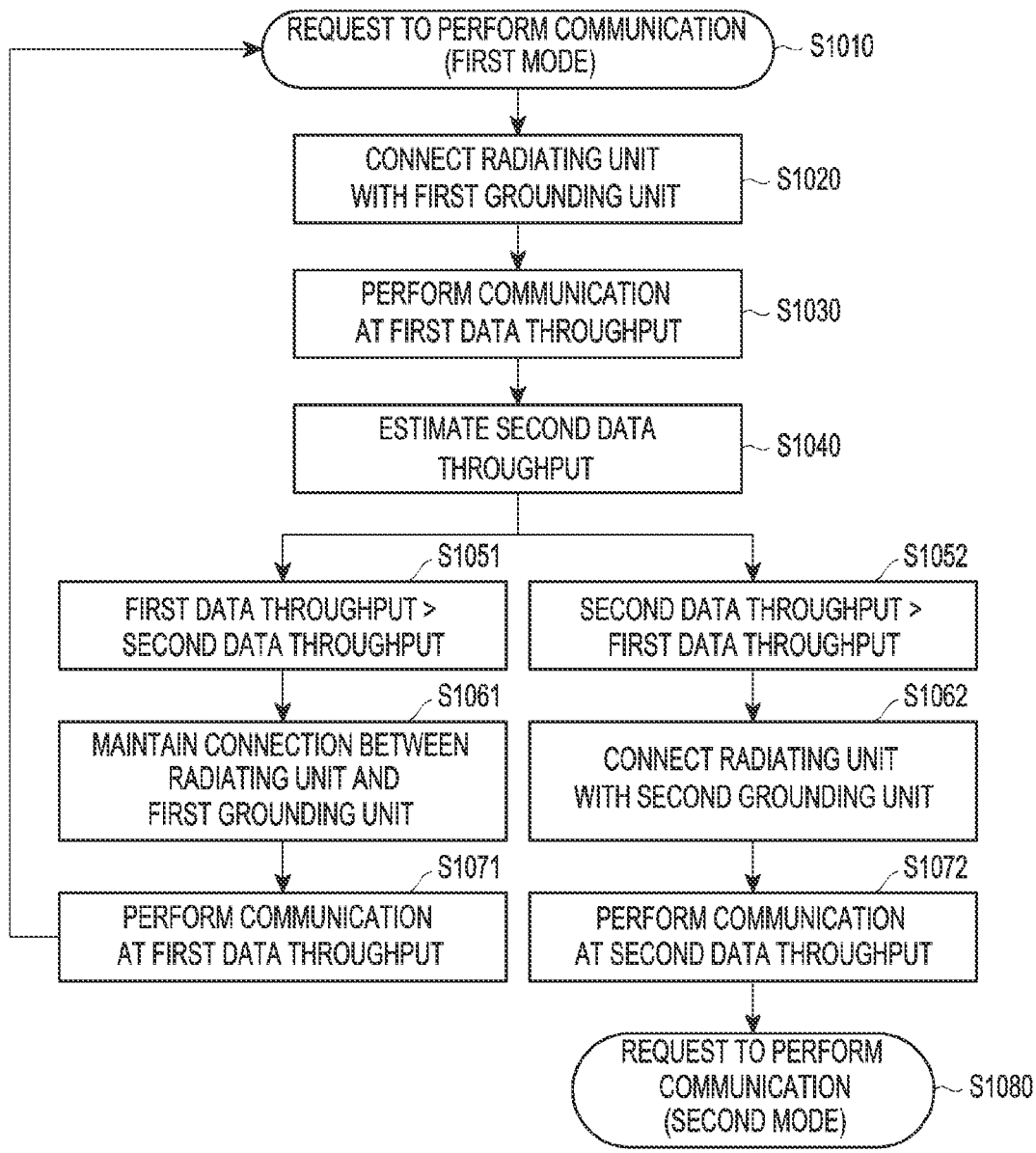
FIG. 10 is a flowchart illustrating a method of changing a grounding unit of an antenna based on data processing speed estimation, according to various embodiments.

FIG. 10 is a flowchart illustrating a method of changing a grounding unit of an antenna (e.g., 360 of FIG. 7) based on the data throughput, according to various embodiments.

In various embodiments of the electronic device described above, the processor (e.g., 330 of FIG. 7) included in the electronic device (e.g., 300 of FIG. 7) may perform operations S1010 to S1080 of FIG. 10.

In relation to operation S1010, the processor (e.g., 330 of FIG. 7) may operate the antenna (e.g., 360 of FIG. 7) in the first mode (mode 1) when there is a request (e.g., Internet or streaming) for performing communication between the electronic device (e.g., 300 of FIG. 7) and the external electronic device (e.g., 200 of FIG. 7).

According to an embodiment, for the antenna (e.g., 360 of FIG. 7) of the electronic device (e.g., 300 of FIG. 7) to operate in the first mode, the connection state of the antenna may need to form a first antenna grounding structure.

In relation to operation S1020, the processor (e.g., 330 of FIG. 7) may control the switch (e.g., 370 of FIG. 7) to connect the radiating unit (e.g., 363 of FIG. 5) and the first grounding unit (e.g., 381 of FIG. 5). In this case, the connection state of the antenna may form the first antenna grounding structure.

In relation to operation S1030, when the antenna forms the first antenna grounding structure, the electronic device (e.g., 300 of FIG. 7) may communicate (e.g., CS1 & CS2 of FIG. 7) with an external electronic device (e.g., 200 of FIG. 7) at a first data throughput.

In relation to operation S1040, while the electronic device (e.g., 300 of FIG. 7) communicates with the external electronic device (e.g., 200 of FIG. 7), the processor (e.g., 330 of FIG. 7) may perform the operation of estimating the second data throughput.

According to an embodiment, the first data throughput may be obtained upon forming an antenna grounding structure (e.g., the first antenna grounding structure) according to an algorithm previously specified in a memory (e.g., 130 of FIG. 1) of an electronic device (e.g., 300 of FIG. 7). In contrast, the second data throughput may be obtained when the processor (e.g., 330 of FIG. 7) operates to form an antenna grounding structure (e.g., the second antenna grounding structure) optimized in terms of data transmission efficiency according to the use environment in which the electronic device (e.g., 300 of FIG. 7) is subjected.

According to an embodiment, the processor (e.g., 330 of FIG. 7) may perform the estimation of the second data throughput when the electric field range of communication between the electronic device (e.g., 300 of FIG. 7) and the external electronic device (e.g., 200 of FIG. 7) is a predetermined electric field range or less, when the signal to noise ratio (SNR) of the communication is less than or equal to a designated SNR value, or when the MCS index received from the external electronic device is less than or equal to a designated MCS index.

In relation to operations S1051 and S1052, the measured first data throughput and the estimated second data throughput may be compared. In relation to operations S1061 and S1062, when the first data throughput is greater than the second data throughput according to the results of operations S1051 and S1052, the connection of the radiating unit and the first grounding unit is maintained and, when the second data throughput is greater than the first data throughput, an operation for connecting the radiating unit and the second grounding unit may be performed.

In relation to operations S1071 and S1072, when the connection between the radiating unit and the first grounding unit is maintained, communication may be performed at the first data throughput (S1071) and, when the radiating unit and the second grounding unit are connected, communication may be performed at the second data throughput (S1072).

In the case of operation S1071, the antenna (e.g., 360 of FIG. 7) of the electronic device (e.g., 300 of FIG. 7) may be meant to operate in the first mode (mode 1), and the connection state of the antenna may be formed in the first antenna grounding structure. In the case of operation S1072, the antenna (e.g., 360 of FIG. 7) of the electronic device (e.g., 300 of FIG. 7) may be meant to operate in the second mode (mode 2), and the connection state of the antenna may be formed in the second antenna grounding structure.

The above-described operations may be repeatedly performed whenever there is a request to perform communication between the electronic device (e.g., 300 of FIG. 7) and the external electronic device (e.g., 200 of FIG. 7). If the communication was performed at the first data throughput before a new communication execution request is received, then it may go back to operation S1010 and perform communication in the first mode (mode 1). In contrast, if communication was performed at the second data throughput before a new communication execution request is received, it may perform communication in the second mode (mode 2) according to operation S1080.

Figure 11:
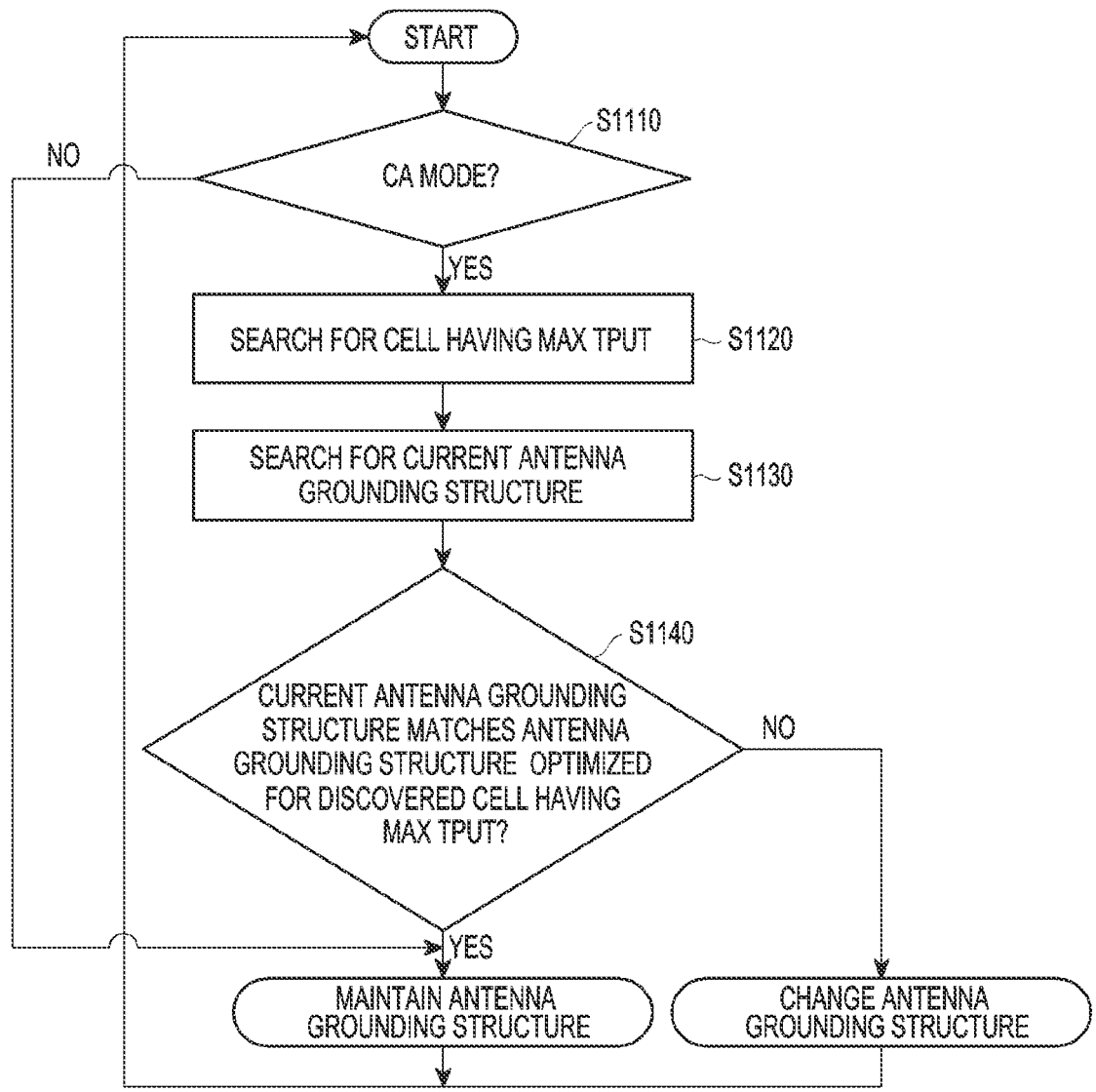
FIG. 11 is a flowchart illustrating a method of changing a switch mode of an antenna supporting carrier aggregation (CA) according to various embodiments.

FIG. 11 is a flowchart illustrating a method of operating an electronic device (e.g., 300 of FIG. 7) having an antenna capable of communicating with an external electronic device (e.g., 200 of FIG. 7) through a plurality of frequency bands, according to various embodiments.

Here, the plurality of frequency bands may include the first frequency band and the second frequency band. According to various embodiments, other various frequency bands (e.g., a third frequency band and a fourth frequency band) may be included.

According to various embodiments, a method for operating an electronic device having an antenna capable of communicating with an external electronic device (e.g., 200 of FIG. 7) via a plurality of frequency bands may include the operation S1110 of determining whether a communication mode of the electronic device (e.g., 300 of FIG. 7) is a carrier aggregation (CA) mode, the operation S1120 of searching for a cell supporting a maximum signal throughput (TPUT), the operation S1130 of identifying an antenna mode of a current state, and the operation S1140 of determining whether the antenna mode of the current state is an antenna mode met by a cell for supporting the maximum TPUT. The above operations may be implemented by a processor (e.g., 330 of FIG. 5) included in the electronic device (e.g., 300 of FIG. 7).

In relation to operation S1110, the processor (e.g., 330 of FIG. 7) may first identify the communication mode of the electronic device (e.g., 300 of FIG. 7). Various embodiments of the disclosure may be performed in the carrier aggregation (CA) mode. According to an embodiment, the carrier aggregation (CA) mode may be selected from inter band carrier aggregation or intra band non-contiguous carrier aggregation. The inter band carrier aggregation mode may mean aggregation of at least two frequency bands between different bands (e.g., LTE B1 and LTE B2 and LTE B3 and, . . . ), and the intra band non-contiguous carrier aggregation mode may mean aggregation of at least two frequency bands which are not contiguous in the same band (e.g., LTE B1 or LTE B2 or LTE B1 or, . . . ). In the case of intra band contiguous carrier aggregation, which is another mode of carrier aggregation (CA), since frequencies of substantially continuous bands are aggregated, data throughput may be enhanced by simply increasing the width of one frequency band. Therefore, the method of changing the antenna grounding unit as in the present invention may not be applied.

In relation to operation 1120, the processor (e.g., 330 of FIG. 7) may search for a cell supporting the maximum data throughput (max TPUT). Here, the cell may be the coverage in which the external electronic device (e.g., 200 of FIG. 7) (e.g., a base station (eNodeB)) supports the network environment, and may be composed of a combination of one primary cell (Pcell) and at least one secondary cell (Scell). For example, there may be provided one Pcell and four Scells. In some network environments, the electronic device (e.g., 300 of FIG. 7) may have the maximum data throughput (max TPUT) upon performing communication by forming an antenna grounding structure optimized for the Pcell and, in other network environments, the electronic device (e.g., 300 of FIG. 7) may have the maximum data throughput (max TPUT) upon performing communication by forming an antenna grounding structure optimized for the Scell.

In relation to operation S1130, the processor (e.g., 330 of FIG. 7) may first identify the antenna grounding structure (or antenna mode) of the electronic device (e.g., 300 of FIG. 5). For example, in a network (e.g., a 5CA network) composed of one Pcell and a plurality of Scells (e.g., four Scells), the electronic device (e.g., 300 of FIG. 5) may perform carrier aggregation (Ca)-based communication by forming a grounding structure (e.g., the first antenna grounding structure) (or first mode) advantageous for the Pcell or an antenna grounding structure (e.g., the second antenna grounding structure) (or second mode) advantageous for the Scell.

In relation to operation 1140, the processor (e.g., 330 of FIG. 7) may determine whether the antenna grounding structure (or antenna mode) in the current state is an antenna grounding structure (or antenna mode) that is met by the cell for supporting the maximum TPUT and, if matched, maintain the current antenna grounding structure but, if not, change the current antenna grounding structure to another antenna grounding structure. For example, when the cell for supporting the maximum TPUT is Scell, and the current antenna grounding structure (or antenna mode) is an antenna grounding structure optimized for the Pcell (e.g., the first antenna grounding structure) (or the first mode), the processor may change the current antenna grounding structure (e.g., the first antenna grounding structure) (or the first mode) into an antenna grounding structure (e.g., the second antenna grounding structure) (or the second mode) optimized for the Scell.

TABLE 4

| Table 4-1 | | | | Table 4-2 | | | |
|---|---|---|---|---|---|---|---|
| | ANT B3 | | | | ANT B1 | | |
| | | | B1 + B3 | | | | B1 + B3 |
| B1 RSRP | B1 TPUT | B3 TPUT | Total TPUT | B1 RSRP | B1 TPUT | B3 TPUT | Total TPUT |
| −70 | 150 | 75 | 225 | −70 | 150 | 75 | 225 |
| −71 | 150 | 75 | 225 | −71 | 150 | 75 | 225 |
| −72 | 150 | 75 | 225 | −72 | 150 | 75 | 225 |

TABLE 4-continued

| | Table 4-1 | | | | Table 4-2 | | |
|---|---|---|---|---|---|---|---|
| | ANT B3 | | | | ANT B1 | | |
| B1 RSRP | B1 TPUT | B3 TPUT | B1 + B3 Total TPUT | B1 RSRP | B1 TPUT | B3 TPUT | B1 + B3 Total TPUT |
| −73 | 150 | 75 | 225 | −73 | 150 | 75 | 225 |
| −74 | 150 | 75 | 225 | −74 | 150 | 75 | 225 |
| −75 | 150 | 75 | 225 | −75 | 150 | 75 | 225 |
| −76 | 150 | 75 | 225 | −76 | 150 | 75 | 225 |
| −77 | 150 | 75 | 225 | −77 | 150 | 75 | 225 |
| −78 | 150 | 75 | 225 | −78 | 150 | 75 | 225 |
| −79 | 150 | 75 | 225 | −79 | 150 | 75 | 225 |
| −80 | 150 | 75 | 225 | −80 | 150 | 75 | 225 |
| −81 | 150 | 75 | 225 | −81 | 150 | 75 | 225 |
| −82 | 150 | 75 | 225 | −82 | 150 | 75 | 225 |
| −83 | 150 | 75 | 225 | −83 | 150 | 75 | 225 |
| −84 | 150 | 75 | 225 | −84 | 150 | 75 | 225 |
| −85 | 150 | 61.5 | 211.5 | −85 | 150 | 75 | 225 |
| −86 | 150 | 61.5 | 211.5 | −86 | 150 | 75 | 225 |
| −87 | 150 | 54.5 | 204.5 | −87 | 150 | 61.5 | 211.5 |
| −88 | 150 | 54.5 | 208.5 | −88 | 150 | 61.5 | 2115 |
| −89 | 150 | 46.5 | 196.5 | −89 | 150 | 54.5 | 204.5 |
| −90 | 150 | 46.5 | 196.5 | −90 | 150 | 54.5 | 204.5 |
| −91 | 150 | 39 | 189 | −91 | 150 | 46.5 | 196.5 |
| −92 | 150 | 32.5 | 182.5 | −92 | 150 | 46.5 | 196.5 |
| −93 | 150 | 32.5 | 182.5 | −93 | 150 | 39 | 189 |
| −94 | 150 | 28 | 178 | −94 | 150 | 32.5 | 182.5 |
| −95 | 150 | 28 | 178 | −95 | 150 | 32.5 | 182.5 |
| −96 | 150 | 23 | 173 | −96 | 150 | 28 | 178 |
| −97 | 150 | 23 | 173 | −97 | 150 | 28 | 178 |
| −98 | 150 | 17.5 | 167.5 | −98 | 150 | 23 | 173 |
| −99 | 150 | 14 | 164 | −99 | 150 | 23 | 173 |
| −100 | 150 | 14 | 164 | −100 | 150 | 17.5 | 167.5 |
| −101 | 150 | 14 | 164 | −101 | 150 | 14 | 164 |
| −102 | 150 | 10.5 | 160.5 | −102 | 123 | 14 | 137 |
| −103 | 150 | 7 | 157 | −103 | 123 | 14 | 137 |
| −104 | 123 | 7 | 130 | −104 | 109 | 10.5 | 119.5 |
| −105 | 123 | 4.5 | 127.5 | −105 | 109 | 7 | 116 |
| −106 | 109 | 4.5 | 113.5 | −106 | 93 | 7 | 100 |
| −107 | 109 | 4.5 | 113.5 | −107 | 93 | 4.5 | 97.5 |
| −108 | 93 | 4.5 | 97.5 | −108 | 78 | 4.5 | 82.5 |
| −109 | 93 | 4.5 | 97.5 | −109 | 78 | 4.5 | 82.5 |
| −110 | 78 | 4.5 | 82.5 | −110 | 65 | 4.5 | 69.5 |
| −111 | 78 | 4.5 | 82.5 | −111 | 56 | 4.5 | 60.5 |
| −112 | 65 | 4.5 | 69.5 | −112 | 56 | 4.5 | 60.5 |
| −113 | 56 | 4.5 | 60.5 | −113 | 46 | 4.5 | 50.5 |
| −114 | 56 | 4.5 | 60.5 | −114 | 46 | 4.5 | 50.5 |
| −115 | 46 | 4.9 | 50.5 | −115 | 35 | 4.5 | 39.5 |
| −116 | 46 | 4.5 | 50.5 | −116 | 28 | 4.5 | 32.5 |

[Table 4] above shows the results of comparison on the maximum data throughput (TPUT) when the electronic device (e.g., 300 of FIG. 7) communicates with the external electronic device (e.g., 200 of FIG. 7) in two different communication modes (e.g., the first mode (mode1) and the second mode (mode2)). In [Table 4], descriptions of item B1, item B3, item B1+B3, item ANT B3, and item ANT B1 may be the same as those in [Table 3] described above. The portion of [Table 4] overlapping [Table 3] is not repetitively described below. According to various embodiments, in an environment where the electric field gradually decreases, the change of the antenna switch connection state based on the data throughput (TPUT) may be performed multiple times. From the notion of time, the change of the antenna switch connection state based on the data throughput (TPUT) may be performed at any time or periodically.

Figure 12:
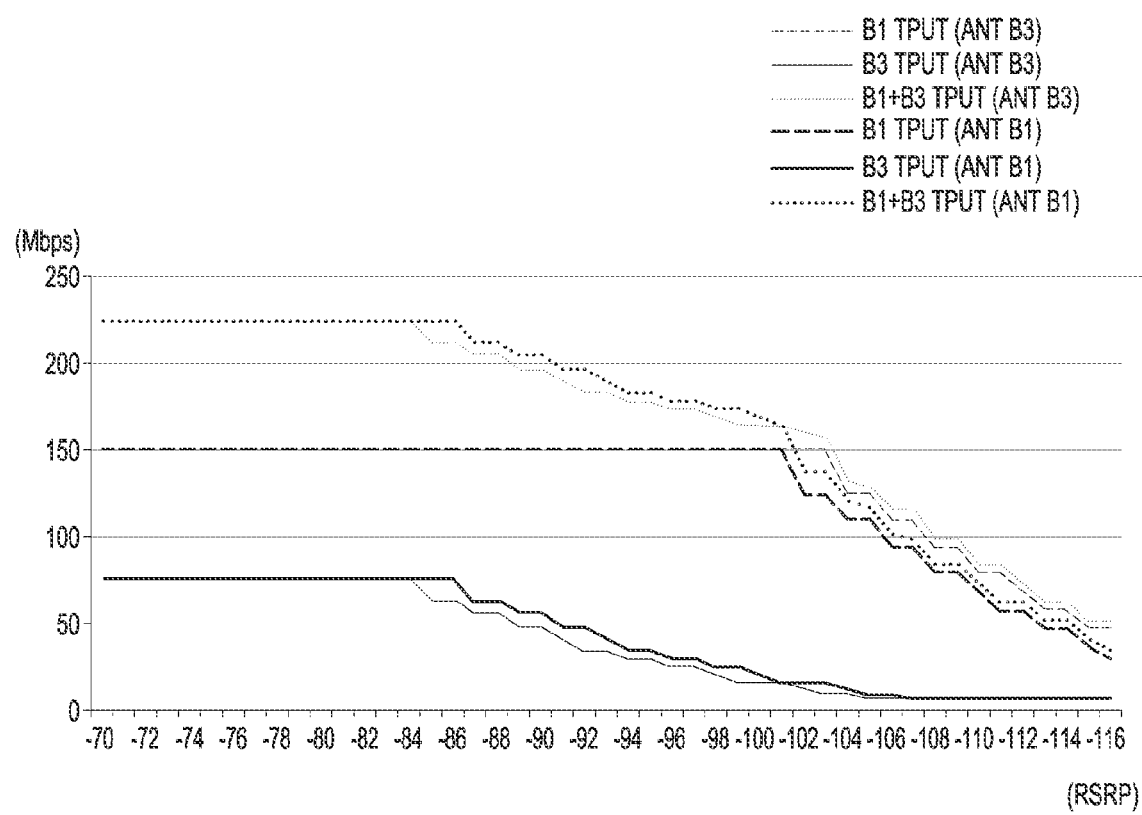
FIG. 12 is a graph illustrating per-electric field data processing speeds (data throughput) of a first frequency band, a second frequency band, and an aggregated wave band (first frequency band and second frequency band) in a first mode and per-electric field data processing speeds (data throughput) of a first frequency band, a second frequency band, and an aggregated wave band (first frequency band and second frequency band) in a second mode according to various embodiments, which differ from those of FIG. 9.

FIG. 12 is a graph illustrating per-electric field data throughputs of the first frequency band (e.g., LTE B1 band), second frequency band (e.g., LTE B3 band), and aggregated wave band (aggregation of the first frequency band and the second frequency band) (e.g., LTE B1+B3 band) in the first mode (mode 1) (e.g., ANT B3) and per-electric field data throughputs of the first frequency band (e.g., LTE B1 band), second frequency band (e.g., LTE B3 band), and aggregated wave band (aggregation of the first frequency band the second frequency band) (e.g., LTE B1+B3 band) in the second mode (mode 2) (e.g., ANT B1), according to an embodiment different from that of FIG. 9. FIG. 12 may be a graph illustrating the results of [Table 4].

According to various embodiments, the electric field (or electric field strength) may be divided into an extremely strong electric field (e.g., about −69 dBm or more) section, a strong electric field (e.g., about −70 dBm to about −84 dBm) section, a medium electric field (e.g., about −85 dBm to about −101 dBm) section, a weak electric field (e.g., about −102 dBm to about −116 dBm) section, and an extremely weak electric field (e.g., about −116 dBm or less) section. Of course, the specific boundaries of the electric field sections may be different according to embodiments.

According to embodiments, the electric field may be divided into a first designated electric field range, a second designated electric field range, and a third designated electric field range in order from the highest to lowest. Here, the first designated electric field range may include the extremely strong electric field (e.g., about −69 dbm or more) section and the strong electric field (e.g., about −70 dBm to about −84 dbm) section, the second designated electric field range may include the medium electric field (e.g., about −85 dBm to −101 dbm) section, and the third designated electric field range may include the weak electric field (e.g., about −102 dBm to about −116 dbm) section and the extremely weak electric field (e.g., about −116 dBm or less) section.

Referring to FIG. 12, in the medium electric field (e.g., about −85 dBm to about −101 dbm) section, the total data throughput (total TPUT) in the first antenna grounding structure (e.g., ANT B3) (or first mode) may be slower than the total data throughput (total TPUT) in the second antenna grounding structure (e.g., ANT B1) (or second mode). However, in the weak electric field (e.g., about −102 dBm to about −116 dbm) section and the extremely weak electric field (e.g., about −116 dBm or less) section, the total data throughput (total TPUT) in the first antenna grounding structure (e.g., ANT B3) (or the first mode) may be higher than the total data throughput (total TPUT) in the second antenna grounding structure (e.g., ANT B1) (or the second mode).

According to an embodiment, when the default value of the antenna grounding structure (or antenna mode) is set to the first antenna grounding structure, which is the grounding structure advantageous for data transmission/reception with the Pcell of the Pcell and the Scell (or the first mode (mode 1) which is the communication mode advantageous for data transmission/reception with the Pcell), the processor (e.g., 330 of FIG. 7) in the environment where the electric field gradually decreases may change the antenna grounding structure into the second antenna grounding structure which is the grounding structure advantageous for data transmission/reception with the Scell of the Pcell and the Scell (or the second mode (mode 2) which is the communication mode advantageous for data transmission/reception with the Scell)). Then, if it is determined that data transmission/reception of the Pcell of the Pcell and Scell is advantageous, the antenna grounding structure may be changed from the second antenna grounding structure to the first antenna grounding structure. In other words, whether the first antenna grounding structure according to the first mode (mode 1) is advantageous or the second antenna grounding structure according to the second mode (mode 2) is advantageous in light of data throughput (TPUT) may differ from one electric field section to another.

According to various embodiments, a data throughput (TPUT) optimization scenario may be implemented for each electric field. For example, the change of the antenna grounding structure according to the change in the network environment (e.g., decrease in signal strength) may be performed for each electric field separately designated into a plurality of ranges. According to various embodiments, the data throughput (TPUT) according to the antenna grounding structure may be separately estimated for each of the electric fields divided into a plurality of ranges. The most robust frequency band in the designated electric field range does not experience a significant change in the maximum data throughput (TPUT) according to the variation in electric field and estimation of the data throughput may thus be omitted. Further, the data throughput may be estimated only in the other remaining frequency bands. That is, when a robust frequency band and another frequency band are in a designated electric field range, data throughput estimation is performed considering only the other frequency band than the robust frequency band, or priority for data throughput estimation may be given to the other frequency band than the robust frequency band.

Referring to [Table 4], in a section above the strong electric field (e.g., about −84 dBm or more) section, the first frequency band (e.g., LTE B1 band) and the second frequency band (e.g., LTE B3 band) may have a constant data throughput (TPUT) regardless of changes in RSRP. Therefore, it is possible to omit the estimation of the data throughput for the first frequency band and the second frequency band above the strong electric field section.

Referring to [Table 4], in the medium electric field section (e.g., about −85 dBm to about −101 dbm), the first frequency band (e.g., LTE B1 band) may have a constant data throughput (TPUT) regardless of the RSRP changes in the medium field section as well. Therefore, in the medium electric field section, estimation of the data throughput for the first frequency band (e.g., LTE B1 band) may be omitted while only the data throughput for the second frequency band (e.g., LTE B3 band) may be estimated. Accordingly, since the data throughput when forming the second antenna grounding structure (or the second mode) is faster than the data throughput when forming the first antenna grounding structure (or the first mode), if the initial antenna grounding structure was the first antenna grounding structure (or the first mode) in the medium electric field section, a process for changing the antenna grounding structure to the second antenna grounding structure (or the second mode) may be performed. If the electric field gradually decreases and enters below the weak electric field (about −102 dBm or less), the change of the antenna switch connection state according to the change in the network environment (e.g., a reduction in signal strength) may be performed without giving priority to data throughput estimation for a specific frequency band or omission of data throughput estimation for the specific frequency band.

Figure 13:
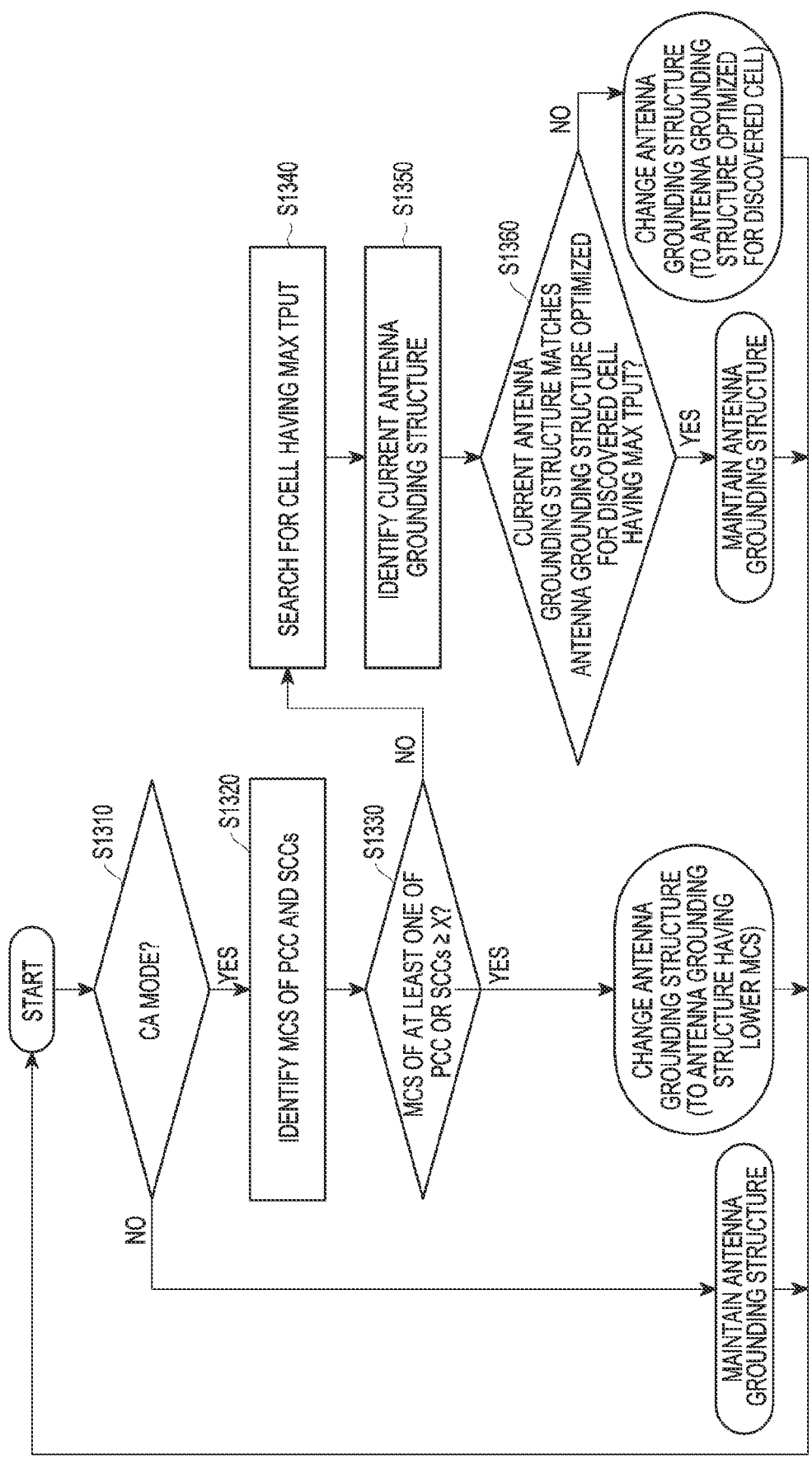
FIG. 13 is a flowchart illustrating a method of changing a switch mode of an antenna supporting carrier aggregation (CA) according to various embodiments.

FIG. 13 is a flowchart illustrating a method of operating an electronic device (e.g., 300 of FIG. 7) having an antenna capable of communicating with an external electronic device (e.g., 200 of FIG. 7) through a plurality of frequency bands, according to various embodiments.

According to various embodiments, a method for operating an electronic device having an antenna capable of communicating with an external electronic device (e.g., 200 of FIG. 7) through a plurality of frequency bands may include the operation S1310 of determining whether a communication mode of the electronic device (e.g., 300 of FIG. 7) is a carrier aggregation (CA) mode, the operation S1320 of identifying an MCS of a PCC and SCCs, the operation S1330 of identifying whether the MCS of the PCC and SCCs is a designated MCS(X) or more, the operation S1340 of searching for a cell supporting a maximum signal throughput (TPUT) if the MCS of at least one of the PCC or SCCs is less than the designated MCS(X), the operation S1350 of identifying an antenna grounding structure of a current state, and the operation S1360 of determining whether the antenna grounding structure of the current state is an antenna grounding structure met by the cell for supporting the maximum TPUT. The above operations may be implemented by a processor (e.g., 330 of FIG. 7) included in the electronic device (e.g., 300 of FIG. 7).

In relation to operation S1310, the processor (e.g., 330 of FIG. 7) may first identify the communication mode of the electronic device (e.g., 300 of FIG. 7), like in operation S1110 of FIG. 11. Various embodiments of the disclosure may be performed in the carrier aggregation (CA) mode. The carrier aggregation (CA) mode may be selected from inter band carrier aggregation or intra band non-contiguous carrier aggregation.

In relation to operation S1320, the processor (e.g., 330 of FIG. 7) may identify the MCS of the PCC and SCCs. According to another embodiment, the processor may identify a signal to noise ratio (SNR) or RSRP, rather than the MCS of PCC and SCCs. Here, the PCC may be a component carrier (CC) that forms a frequency band in which data transmission/reception with the Pcell is optimized in the electronic device (e.g., 300 of FIG. 7). The SCC may be a component carrier (CC) that forms a frequency band in which data transmission/reception with the Scell is optimized in the electronic device (e.g., 300 of FIG. 7). The SCCs may mean a plurality of SCCs (e.g., four SCCs).

In relation to operation S1330, the processor (e.g., 330 of FIG. 7) may identify whether the MCS of the PCC and SCCs is the designated MCS(X) or more. Here, the designated MCS(X) may correspond to, e.g., MCS 27 for which modulation 64QAM and the coding rate is about 0.75, as described above in connection with [Table 1]. According to an embodiment, as the designated MCS(X), the max MCS (e.g., MCS 28) may be designated. According to another embodiment, when the signal to noise ratio (SNR), rather than the MCS, is identified, the designated SNR may correspond to SNR 30. When the RSRP is identified according to another embodiment, the designated RSRP may correspond to an RSRP of about −84 dbm. When the MCS of a certain PCC or certain SCCs has a value equal to or greater than the designated MCS(X) through operation S1330, e.g., in the corresponding CC (carrier component), it may be estimated that the first frequency band and the second frequency band have a sufficient data throughput, so that estimation of the data throughput (TPUT) for the corresponding CC may be omitted. For example, if the MCS(X) for PCC corresponds to MCS 28, the change of the antenna grounding structure (or estimation of the data throughput) according to the change in the network environment on the PCC (or Pcell) (e.g., decrease in signal strength) may be omitted, and the change of antenna switch connection state (or estimation of data throughput) according to the change in the network environment (e.g., reduction in signal strength) may be performed on the remaining SCCs. According to the above embodiment, unnecessary operations performed by the processor (e.g., 330 of FIG. 7) may be reduced.

Hereinafter, operation S1340 may correspond to operation S1120 of FIG. 11, operation S1350 may correspond to operation S1130 of FIG. 11, and operation S1360 may correspond to operation S1140 of FIG. 11. Thus, no duplicate description is given below, and the description of similar operations of FIG. 11 may be applied to FIG. 13.

The method of operating an electronic device according to the embodiment disclosed in FIG. 13 is different from that of FIG. 11 in that in FIG. 13, a cell having a designated MCS (or SNR or RSR) is searched before searching for a cell for supporting the maximum TPUT and, when there is a cell having the designated MCS, the operation of excluding it from the target for estimating the data throughput upon changing antenna modes may further be included.

According to various embodiments, the above-described embodiments may be applied even when the first frequency band and the second frequency band have the same bandwidth. That is, the various embodiments of the disclosure are not necessarily limited to the cases where the first frequency band and the second frequency band have different bandwidths. However, the difference in data throughput (TPUT) per frequency band according to the decrease in the electric field may be more significant than when they have different bandwidths. Thus, the method for operating an electronic device as disclosed herein may apply where the first frequency band and the second frequency band have different bandwidths.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments of the disclosure, there may be provided an electronic device (e.g., 300 of FIG. 5) comprising an antenna (or antenna module) (e.g., 360 of FIG. 5) including a radiating unit (e.g., 363 of FIG. 5) capable of communication through a first frequency band and a second frequency band and a power feeding unit (e.g., 361 of FIG. 5), a switch (e.g., 370 of FIG. 5) configured to selectively connect at least one of a first grounding unit (e.g., 381 of FIG. 5) of the electronic device, corresponding to the first frequency band and a second grounding unit (e.g., 382 of FIG. 5) of the electronic device, corresponding to the second frequency band to the radiating unit, and a processor (e.g., 330 of FIG. 5) configured to perform communication with an external electronic device (e.g., 200 of FIG. 7) at a first data throughput through the first frequency band and the second frequency band, with the radiating unit and the first grounding unit connected together using the switch, and estimate a second data throughput to be executed through the first frequency band and the second frequency band in relation to a state in which the radiating unit and the second grounding unit are to be connected using the switch while performing the communication with the external electronic device, when the first data throughput is greater than the second data throughput, perform the communication with the external electronic device while maintaining the connection between the radiating unit and the first grounding unit using the switch, and when the second data throughput is greater than the first data throughput, connect the radiating unit and the second grounding unit using the switch and perform the communication with the external electronic device, with the radiating unit and the second grounding unit connected together using the switch.

According to various embodiments of the disclosure, there may be provided an electronic device (e.g., 300 of FIG. 5) comprising an antenna (or antenna module) including a radiating unit (e.g., 363 of FIG. 5) capable of communication through a first frequency band and a second frequency band and a power feeding unit (e.g., 361 of FIG. 5), a switch (e.g., 370 of FIG. 5) configured to selectively connect at least one of a first grounding unit (e.g., 381 of FIG. 5) of the electronic device, corresponding to the first frequency band and a second grounding unit (e.g., 382 of FIG. 5) of the electronic device, corresponding to the second frequency band to the radiating unit, and a processor (e.g., 330 of FIG. 5) configured to connect at least one of the first grounding unit and the second grounding unit to the radiating unit based on a parameter indicating a signal strength and estimate, at least once, a data throughput according to at least one antenna switch grounding structure, and control the switch by connecting at least one of the first grounding unit and the second grounding unit to the radiating unit to implement an antenna switch grounding structure having a quickest data throughput based on the estimated data throughput.

According to various embodiments, the first frequency band and the second frequency band may not be contiguous to each other. According to various embodiments, the first frequency band and the second frequency band may be adjacent to each other.

According to various embodiments, the first frequency band and the second frequency band may have different bandwidths.

According to various embodiments, the processor may be configured to estimate the data throughput based on, at least, a parameter related to a signal strength of the communication.

According to various embodiments, the processor may be configured to perform execution of the data throughput when an electric field range of the communication is a designated electric field range or less, a signal to noise ratio (SNR) of the communication is a designated SNR value or less, or a modulation and coding scheme (MCS) index received from the external electronic device is a designated MCS index or less.

According to various embodiments, the processor may be configured to determine whether to perform the communication at the first data throughput or the second data throughput per electric field depending on a plurality of separately designated electric field ranges and to perform the communication with the external electronic device. According to various embodiments, the electric field ranges may be divided into a first designated electric field range, a second electric field range, and a third electric field range in order from highest to lowest. Estimation of the second data throughput may be performed in the second designated electric field range and the third designated electric field range. In the second designated electric field range, the second data throughput may be estimated, with at least one of the first frequency band and the second frequency band excluded.

According to various embodiments of the disclosure, there may be provided a method for operating an electronic device having an antenna capable of communication with an external electronic device through a plurality of frequency bands, comprising determining (e.g., S1110 of FIG. 11) whether a communication mode of the electronic device is a carrier aggregation (CA) mode, searching (e.g., S1120 of FIG. 11) for a cell supporting a maximum data throughput, identifying (e.g., S1130 of FIG. 11) an antenna grounding structure in a current state, and determining (e.g., S1140 of FIG. 11) whether the antenna grounding structure in the current state is an antenna grounding structure for meeting a frequency band allocated to a cell for supporting the maximum data throughput.

According to various embodiments, the method may further comprise, unless the antenna grounding structure in the current state is the antenna grounding structure for meeting the frequency band allocated to the cell for supporting the maximum data throughput, changing the antenna grounding structure to meet the frequency band allocated to the cell for supporting the maximum data throughput. The method for operating the electronic device further comprising changing the antenna grounding structure may be steadily performed under a designated network use environment. Here, the designated network use environment may mean a network use environment supporting a carrier aggregation (CA) mode.

According to various embodiments, the carrier aggregation (CA) mode may be selected from inter band carrier aggregation or intra band non-contiguous carrier aggregation.

According to various embodiments, the method of operating the electronic device may be performed when an electric field range of the communication is a designated electric field range or less, a signal to noise ratio (SNR) of the communication is a designated SNR value or less, or a modulation and coding scheme (MCS) index received from the external electronic device is a designated MCS index or less.

According to various embodiments, the method may further comprise, before searching for the cell for supporting the maximum data throughput, searching for a cell having a designated MCS value or more and, when there is a cell having the designated MCS value or more, excluding a frequency band allocated to the cell having the designated MCS value or more from frequency bands considered in changing the antenna mode.

While the present invention has been shown and described with reference to exemplary embodiments thereof, it will be apparent to those of ordinary skill in the art that various changes in form and detail may be made thereto without departing from the spirit and scope of the present invention as defined by the following claims.

What is claimed is:

1. An electronic device, comprising:
an antenna including a radiating unit capable of communication through a first frequency band and a second frequency band and a power feeding unit;
a switch configured to selectively connect at least one of a first grounding unit of the electronic device, corresponding to the first frequency band and a second grounding unit of the electronic device, corresponding to the second frequency band to the radiating unit; and
a processor configured to:
connect at least one of the first grounding unit and the second grounding unit to the radiating unit based on a parameter indicating a signal strength and estimate, at least once, a data throughput according to at least one antenna switch grounding structure; and
control the switch by connecting at least one of the first grounding unit and the second grounding unit to the radiating unit to implement an antenna switch grounding structure having a quickest data throughput based on the estimated data throughput.

2. The electronic device of claim 1, wherein the processor is configured to:
perform communication with an external electronic device by a first data throughput through the first frequency band and the second frequency band, with the radiating unit and the first grounding unit connected together using the switch; and
estimate a second data throughput to be executed through the first frequency band and the second frequency band in relation to a state in which the radiating unit and the second grounding unit are to be connected using the switch while performing the communication with the external electronic device.

3. The electronic device of claim 2, wherein the processor is configured to:
when the first data throughput is greater than the second data throughput, perform the communication with the external electronic device while maintaining the connection between the radiating unit and the first grounding unit using the switch; and
when the second data throughput is greater than the first data throughput, connect the radiating unit and the second grounding unit using the switch and perform the communication with the external electronic device, with the radiating unit and the second grounding unit connected together using the switch.

4. The electronic device of claim 1, wherein the first frequency band and the second frequency band are not contiguous to each other.

5. The electronic device of claim 4, wherein the first frequency band and the second frequency band are adjacent to each other.

6. The electronic device of claim 1, wherein the first frequency band and the second frequency band have different bandwidths.

7. The electronic device of claim 1, wherein the processor is configured to estimate the data throughput based on, at least, a parameter related to a signal strength of the communication.

8. The electronic device of claim 1, wherein the processor is configured to perform execution of the data throughput when an electric field range of the communication is a designated electric field range or less, a signal to noise ratio (SNR) of the communication is a designated SNR value or less, or a modulation and coding scheme (MCS) index received from the external electronic device is a designated MCS index or less.

9. The electronic device of claim 1, wherein the processor is configured to determine whether to perform the communication at the first data throughput or the second data throughput per electric field depending on a plurality of separately designated electric field ranges and to perform the communication with the external electronic device.

10. The electronic device of claim 9, wherein the electric field ranges are divided into a first designated electric field range, a second electric field range, and a third electric field range in order from highest to lowest, wherein estimation of the second data throughput is performed in the second designated electric field range and the third designated electric field range, and wherein in the second designated electric field range, the second data throughput is estimated, with at least one of the first frequency band and the second frequency band excluded.

* * * * *